(12) United States Patent
Liang et al.

(10) Patent No.: US 12,572,584 B2
(45) Date of Patent: Mar. 10, 2026

(54) DATA STORAGE METHOD AND APPARATUS BASED ON BLOCKCHAIN NETWORK

(71) Applicant: TENCENT TECHNOLOGY (SHENZHEN) COMPANY LIMITED, Guangdong (CN)

(72) Inventors: Zuodong Liang, Shenzhen (CN); Yang Mo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/983,997

(22) Filed: Nov. 9, 2022

(65) Prior Publication Data

US 2023/0078541 A1     Mar. 16, 2023

Related U.S. Application Data

(63) Continuation of application No. PCT/CN2022/088368, filed on Apr. 22, 2022.

(30) Foreign Application Priority Data

May 12, 2021     (CN) .......................... 202110515287.1

(51) Int. Cl.
     *G06F 16/41*          (2019.01)
     *G06F 16/27*          (2019.01)
(52) U.S. Cl.
     CPC ............. *G06F 16/41* (2019.01); *G06F 16/275* (2019.01)
(58) Field of Classification Search
     CPC ............................... G06F 16/41; G06F 16/275
     See application file for complete search history.

(56) References Cited

U.S. PATENT DOCUMENTS

| | | | | |
|---|---|---|---|---|
| 11,101,995 | B1 * | 8/2021 | Oliver | ................... G06F 16/783 |
| 2018/0218176 | A1 * | 8/2018 | Voorhees | ............... G06Q 20/02 |

(Continued)

FOREIGN PATENT DOCUMENTS

| | | |
|---|---|---|
| CN | 111177257 A | 5/2020 |
| CN | 111262876 A | 6/2020 |

(Continued)

OTHER PUBLICATIONS

D. Bhowmik and T. Feng, "The multimedia blockchain: A distributed and tamper-proof media transaction framework," 2017 22nd International Conference on Digital Signal Processing (DSP), London, UK, 2017, pp. 1-5, https://ieeexplore.ieee.org/document/ 8096051 (Year: 2017).*

(Continued)

*Primary Examiner* — Khanh B Pham
*Assistant Examiner* — Brooks T Hale
(74) *Attorney, Agent, or Firm* — Sughrue Mion, PLLC

(57)                ABSTRACT

A data storage method and apparatus, an electronic device, a non-transitory computer-readable storage medium, and a computer program product are provided. The method includes: receiving a storage request carrying multimedia data transmitted by a target device, storing multimedia data in local space of a target storage node, and generating a target storage proof of the multimedia data, the target storage proof indicating that the target storage node has stored the multimedia data, and transmitting the target storage proof to a consensus node, to cause the consensus node, after receiving an uploading request about the multimedia data transmitted by the target device, to perform consensus verification on the multimedia data according to the target storage proof, and store a data identifier of the multimedia data that passes the consensus verification in a blockchain of the consensus node.

14 Claims, 9 Drawing Sheets

```
┌────────────────────────────────────────────────────────────┐  ╱ S201
│      Receive a storage request transmitted by a target device │ ╱
└────────────────────────────────────────────────────────────┘
                              │
                              ▼
┌────────────────────────────────────────────────────────────┐  ╱ S202
│  Store multimedia data in a local space of a target storage node, │ ╱
│   and generate a target storage proof of the multimedia data  │
└────────────────────────────────────────────────────────────┘
                              │
                              ▼
┌────────────────────────────────────────────────────────────┐  ╱ S203
│       Transmit a target storage proof to a consensus node     │ ╱
└────────────────────────────────────────────────────────────┘
```

(56)  References Cited

U.S. PATENT DOCUMENTS

2018/0276668 A1* 9/2018 Li ......................... H04L 9/3239
2020/0028688 A1  1/2020 Takada
2020/0050386 A1  2/2020 Natarajan et al.
2020/0357005 A1* 11/2020 Yang ...................... G10L 17/06

FOREIGN PATENT DOCUMENTS

CN       111639074 A    9/2020
CN       112988667 A    6/2021
WO    2020/108441 A1   6/2020

OTHER PUBLICATIONS

International Search Report for PCT/CN2022/088368 dated Jul. 20, 2022 [PCT/ISA/210].
Written Opinion for PCT/CN2022/088368 dated Jul. 20, 2022 [PCT/ISA/237].

* cited by examiner

Receive a storage request transmitted by a target device S201

Store multimedia data in a local space of a target storage node, and generate a target storage proof of the multimedia data S202

Transmit a target storage proof to a consensus node S203

301

Upload a file

XXX.pdf

3011

Submit

Target device

Tax bureau

Billing party

Storage request

User side

Storage node 1

Storage node 2

Storage node 3

Storage node 4

Storage node 5

Storage node 6

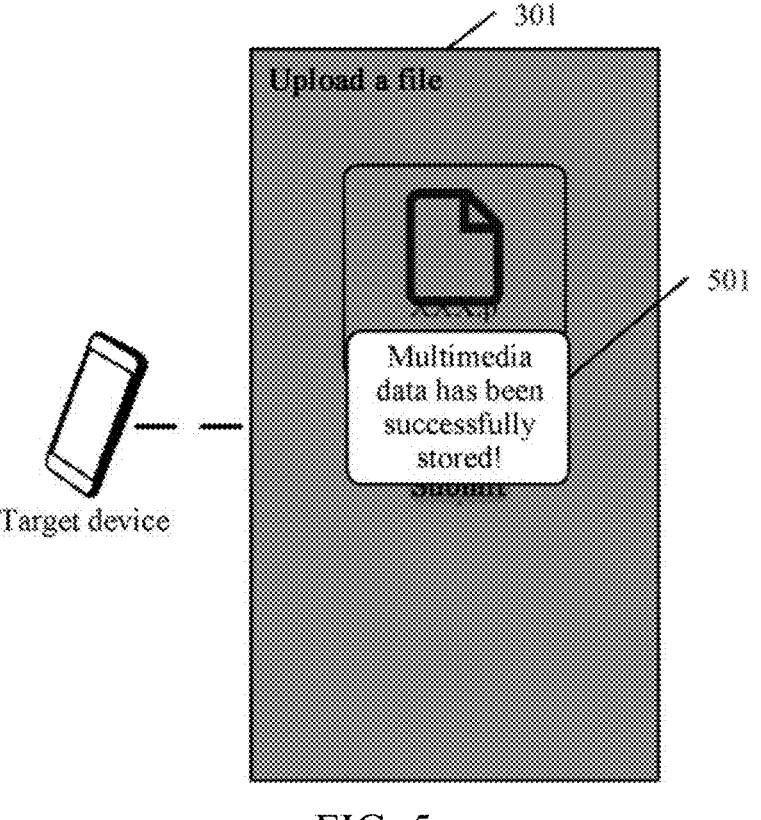

FIG. 5

| S601 |
| --- |
| Receive an uploading request about multimedia data transmitted by a target |

↓

| S602 |
| --- |
| Obtain a target storage proof about the multimedia data |

↓

| S603 |
| --- |
| Perform consensus verification on the multimedia data according to the target storage proof, and store a data identifier of the multimedia data in a blockchain of a consensus node after the multimedia data passes the consensus verification |

DATA STORAGE METHOD AND APPARATUS BASED ON BLOCKCHAIN NETWORK

CROSS-REFERENCE TO RELATED APPLICATION(S)

This application is a continuation application of International Application No. PCT/CN2022/088368, filed on Apr. 22, 2022, which claims priority to Chinese Patent Application No. 202110515287.1, filed with the China National Intellectual Property Administration on May 12, 2021, the disclosures of which are herein incorporated by reference in their entireties.

FIELD

The disclosure relates to the field of computer technology, and in particular, to data storage based on a blockchain network.

BACKGROUND

With the rapid development of computer technology, the blockchain network has gradually attracted the attention of users, and more and more users or enterprises choose to store data in the blockchain network to prevent data from being tampered with. In the related technology, data uploaded by the users or enterprises is usually stored by using a blockchain in the blockchain network. However, if all data is stored in the blockchain, especially some data with relatively large storage memory, it causes a relatively large data volume in the blockchain, thereby affecting the operation efficiency and stability of the blockchain network.

SUMMARY

An aspect of an example embodiment provides a data storage method performed by at least one processor, and the data storage method includes: receiving a storage request transmitted by a target device, the storage request carrying multimedia data; storing the multimedia data in a local space of a target storage node in a blockchain network, and generating a target storage proof of the multimedia data, the target storage proof indicating that the target storage node having stored the multimedia data; and transmitting the target storage proof to a consensus node in the blockchain network, to cause the consensus node, after receiving an uploading request about the multimedia data transmitted by the target device, to perform consensus verification on the multimedia data according to the target storage proof, and store a data identifier of the multimedia data that passes the consensus verification in a blockchain of the consensus node.

An aspect of an example embodiment provides a data storage method performed by a at least one processor, and the data storage method includes: receiving an uploading request about multimedia data transmitted by a target device; obtaining a target storage proof about the multimedia data, the target storage proof being generated and transmitted to a consensus node in a blockchain network after a target storage node in the blockchain network receives a storage request transmitted by the target device, and the target storage proof indicating that the target storage node has stored the multimedia data; and performing consensus verification on the multimedia data according to the target storage proof, and storing a data identifier of the multimedia data that passes the consensus verification in a blockchain of the consensus node.

An aspect of an example embodiment provides a data storage apparatus including: at least one memory configured to store program code; and at least one processor configured to read the program code and operate as instructed by the program code, the program code comprising: receiving code configured to cause the at least one processor to receive a storage request transmitted by a target device, the storage request carrying multimedia data; and processing code configured to cause the at least one processor to: store the multimedia data in a local space of a target storage node in a blockchain network, and generate a target storage proof of the multimedia data, the target storage proof indicating that the target storage node has stored the multimedia data; and transmit the target storage proof to a consensus node in the blockchain network, to cause the consensus node, after receiving an uploading request about the multimedia data transmitted by the target device, to perform consensus verification on the multimedia data according to the target storage proof, and store a data identifier of the multimedia data that passes the consensus verification in a blockchain of the consensus node.

An aspect of an example embodiment provides a data storage apparatus including: at least one memory configured to store program code; and at least one processor configured to read the program code and operate as instructed by the program code, the program code comprising: obtaining code configured to cause the at least one processor to: receive an uploading request about multimedia data transmitted by a target device; and obtain a target storage proof about the multimedia data, the target storage proof being generated and transmitted to a consensus node in a blockchain network after a target storage node in the blockchain network receives a storage request transmitted by the target device, and the target storage proof indicating that the target storage node has stored the multimedia data; and processing code configured to cause the at least one processor to perform consensus verification on the multimedia data according to the target storage proof, and store a data identifier of the multimedia data that passes the consensus verification in a blockchain of the consensus node.

An aspect of an example embodiment provides a data storage device, based on a blockchain network, including: a processor, being adapted to execute a computer program; and a computer-readable storage medium, storing a computer program, the computer program, when executed by a processor, implementing the data storage method provided in an example embodiment.

An aspect of an example embodiment provides a non-transitory computer-readable storage medium, storing a computer code that, when executed by at least one processor causes the at least one processor to implement the data storage method provided in an example embodiment.

An aspect of an example embodiment provides a computer program product or a computer program, the computer program product or the computer program including computer instructions, the computer instructions being stored in a computer-readable storage medium. A processor of a data storage device reads the computer instructions from the computer-readable storage medium, and executes the computer instructions, to cause the data storage device to perform the data storage method provided in an example embodiment.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 5 is a schematic diagram of an interface for displaying a notification message according to some embodiments.

FIG. 6 is a schematic flowchart of another data storage method based on a blockchain network according to some embodiments.

DETAILED DESCRIPTION

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

Some embodiments provide a data storage method and apparatus based on a blockchain network, which can separate consensus and storage of multimedia data in the blockchain network, and improve the operation efficiency and stability of the blockchain network.

In some embodiments, the target device transmits a storage request to the target storage node, and the target storage node stores the multimedia data carried by the storage request to the target storage node in response to the storage request; and the target storage node further generates a target storage proof about the multimedia data, and transmits the target storage proof to the consensus node, so that the consensus node may store the data identifier about the multimedia data to the blockchain on the consensus node after the consensus verification on the multimedia data succeeds. In this way, the data identifier in the blockchain indicates that the blockchain network has successfully stored the multimedia data. In the process, a target storage node independent of the consensus node may be used for storing the multimedia data with a relatively large data volume, and only the data identifier with a relatively small data volume may be stored in the blockchain. The manner that separately stores the multimedia data and the data identifier may improve the security of the multimedia data to a certain extent, and may effectively reduce the storage pressure of the blockchain compared with storing the multimedia data in the blockchain, thereby reducing the storage pressure of the consensus node and improving the operation efficiency and stability of the consensus node.

In the following descriptions, related "some embodiments" describe a subset of all possible embodiments. However, it may be understood that the "some embodiments" may be the same subset or different subsets of all the possible embodiments, and may be combined with each other without conflict.

Figure 1A:
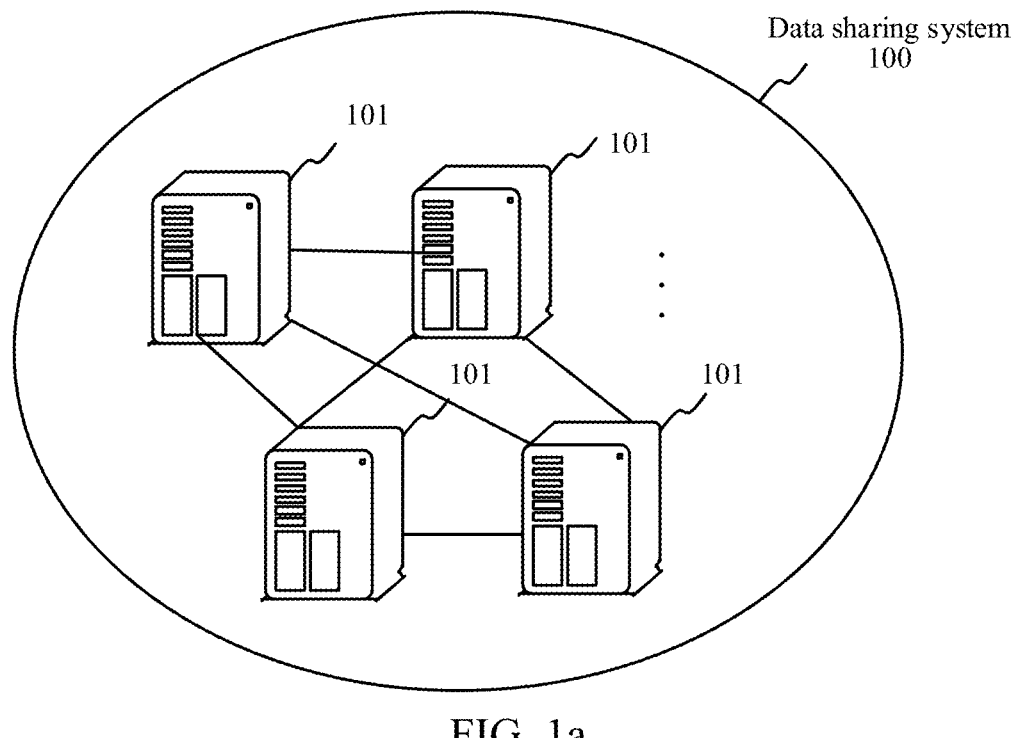
FIG. 1A is a schematic diagram of an architecture of a data sharing system according to some embodiments.

Some embodiments relate to blockchain technology. Terms and concepts related to the blockchain technology are briefly introduced below:

The blockchain network may be understood as a data sharing system 100, and the data sharing system 100 may refer to a system for data sharing between nodes. For an exemplary structure of the data sharing system 100, reference may be made to FIG. 1A; and as shown in FIG. 1A, the data sharing system 100 may include a plurality of nodes 101, and the plurality of nodes 101 may refer to each client (or terminal device, server, or the like) in the data sharing system 100. To ensure information intercommunication in the data sharing system 100, an information connection may exist between nodes in the data sharing system 100, so that information transmission may be implemented between the nodes, thereby implementing information sharing. A manner to implement the information connection between the nodes may include the following: each node in the data sharing system 100 has a node identifier corresponding to the node, and each node in the data sharing system 100 may store the node identifiers of other nodes in the data sharing system 100. In this way, any node may implement information sharing (for example, broadcast the generated block to other nodes in the data sharing system 100) according to the node identifiers of other nodes. Each node may maintain a node identifier list shown in the following table, and store node names and node identifiers correspondingly in the node identifier list. A node identifier may be an Internet Protocol (IP) address and any other type of information capable of identifying the node. IP addresses in Table 1 are only used as an example for description.

TABLE 1

| Node identifier list | |
|---|---|
| Node name | Node identifier |
| Node 1 | 117.114.151.174 |
| Node 2 | 117.116.189.145 |
| . . . | . . . |
| Node S (S is a positive integer) | xx. xx. xx.xx |

Figure 1B:
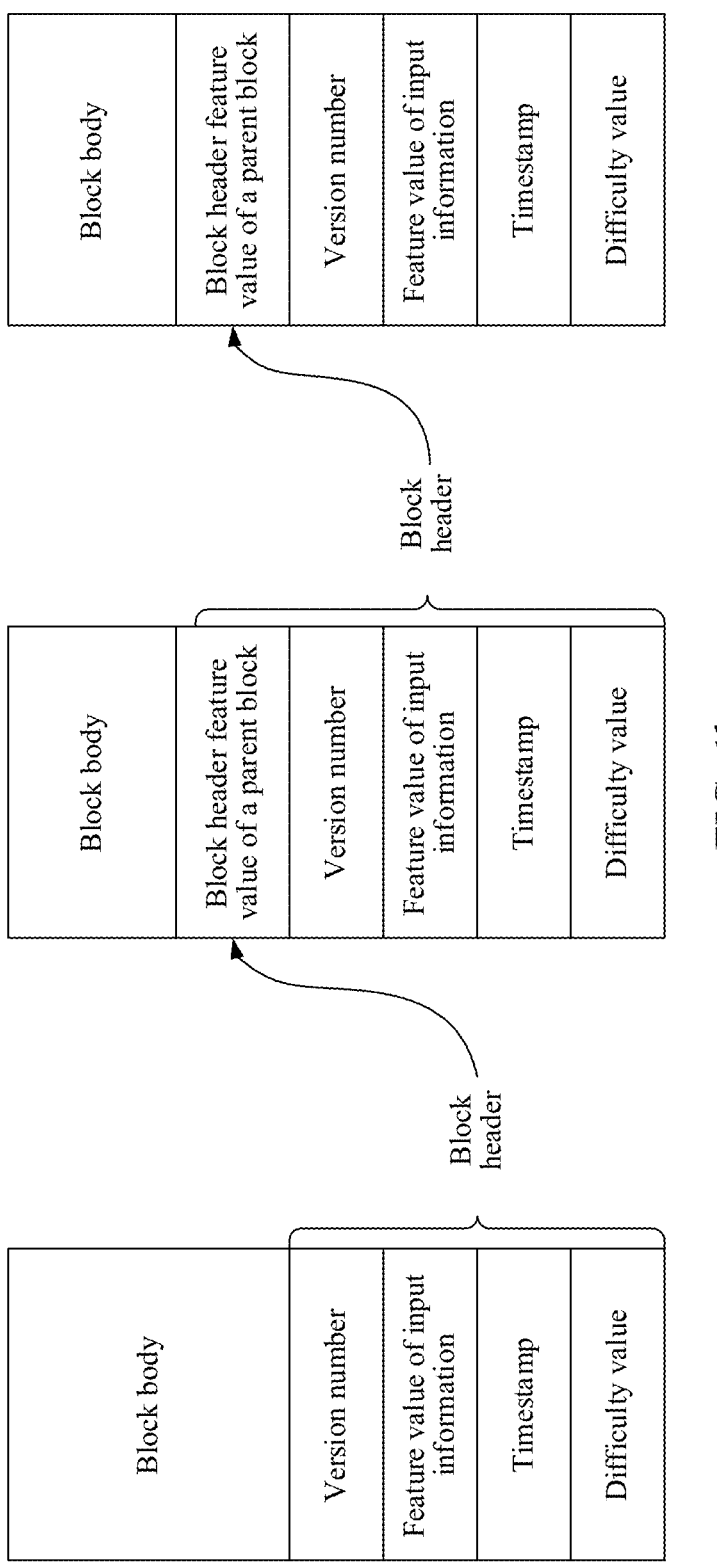
FIG. 1B is a schematic structural diagram of a block according to some embodiments.

Each node in the data sharing system 100 stores an identical blockchain. A blockchain is a new application mode of computer technologies such as distributed data storage, peer to peer (P2P) transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain includes a plurality of blocks, each block includes input information, and the node stores the input information by storing the blockchain. For a schematic diagram of a structure of a block, reference may be made to FIG. 1B. As shown in FIG. 1B, a founding block of a block includes a block header and a block body. The block header stores a feature value, a version number, a timestamp, and a difficulty value of input information, and the block body stores the input information. A next block of the genesis block uses the genesis block as a parent block, and the next block also includes a block header and a block body. The block header stores a feature value, the feature value in the block header of the parent block, a version number, a timestamp, and a difficulty value of input information of the current block, and the rest is deduced by analogy, so that block data stored in each block in the blockchain is associated with block data stored in the parent block, ensuring the security of the input information in the blocks.

The node in the data sharing system 100 performs consensus on the input information, and after the consensus succeeds, a process of uploading the block generated by the input information to the blockchain (that is, adding the block to the blockchain) may include the following: when any node in the data sharing system 100 receives the input information, other nodes in the data sharing system 100 performs consensus on the input information according to the consensus algorithm, and after the consensus succeeds, the input information is generated into a block, and the block is added to the blockchain, thereby implementing distributed storage on the input information, so that the data stored on all nodes in the data sharing system 100 are consistent. The node that performs consensus on the input information according to the consensus algorithm is usually referred to as the consensus node, which is described herein.

It has been found through practice that the storage space of the consensus node is limited. If all the data whose consensus succeeds is stored in the blockchain included in the consensus node, it may lead to a relatively large storage pressure on the consensus node, and reduce the remaining memory space of the consensus node, thereby leading to the relatively low operation efficiency and relatively poor stability of the consensus node. For example, when the to-be-stored data is large file data (such as multimedia data with a large storage memory, or the like) that occupies a relatively large amount of storage memory, the large file data is stored in the blockchain included in the consensus node, and the storage space of the consensus node is reduced, thereby reducing the consensus efficiency of the consensus node. In addition, when the blockchain is applied in some scenarios with a relatively high requirement for information security, for example, when the to-be-stored data is related to personal privacy or national security, it is also not suitable for all consensus nodes to store data. Based on this, to improve the storage efficiency of nodes in the blockchain network and maintain the security and privacy of data, some embodiments proposes a data storage solution based on a blockchain network, and the data storage solution based on the blockchain network may be referred to as a data storage solution for short. The data storage solution introduces a storage node that is independent of the consensus node and is responsible for storage in the blockchain network, and is responsible for the storage of data in the blockchain through the storage node instead of storing the data in the blockchain; and by separating data storage and data consensus, the storage pressure of the consensus node may be reduced, and it is ensured that the consensus node may perform consensus verification on data, which is also conducive to privacy protection of data.

Figures 1C, 2:
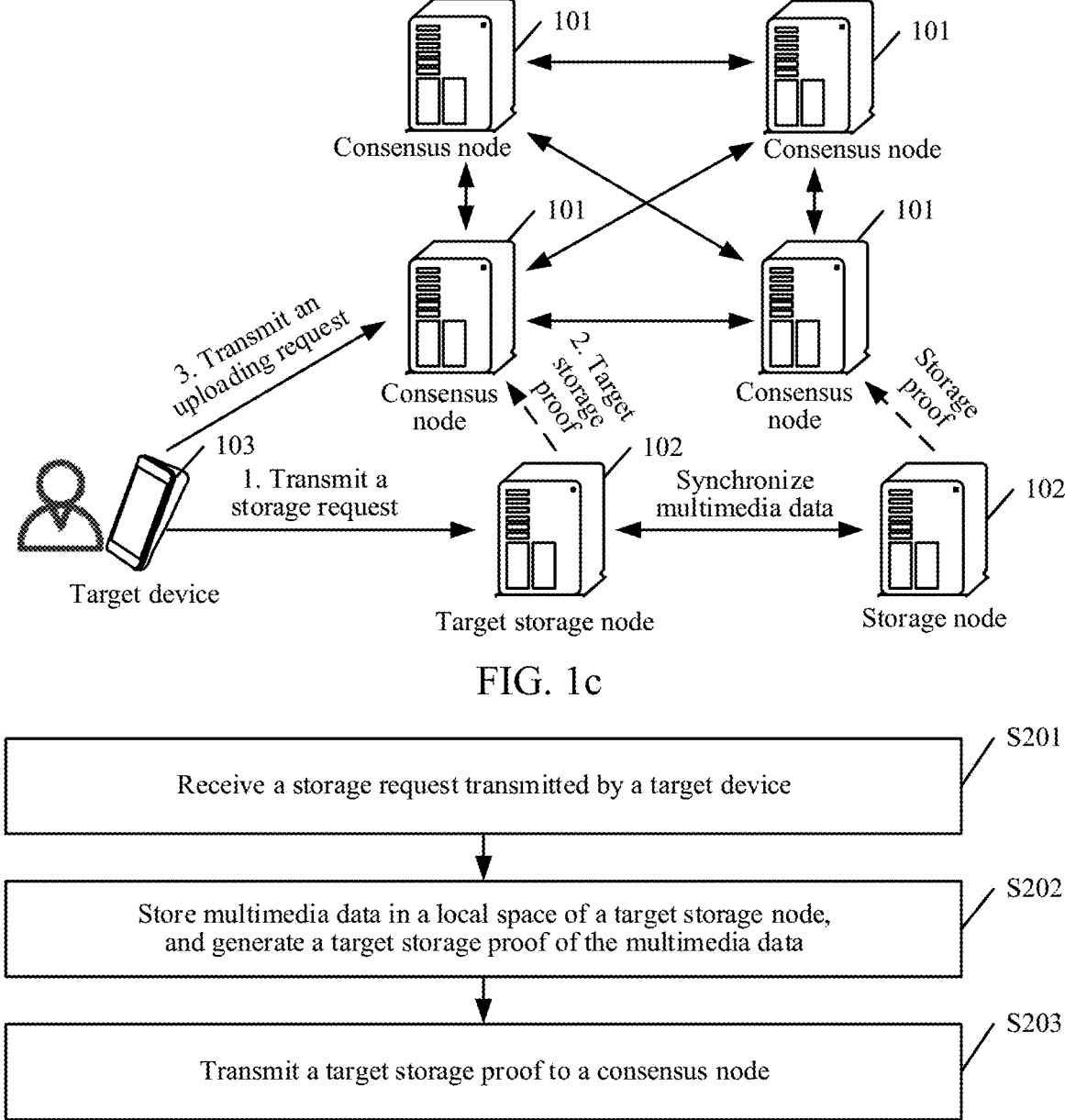
FIG. 1C is a schematic diagram of an architecture of a data storage system based on a blockchain network according to some embodiments.
FIG. 2 is a schematic flowchart of a data storage method based on a blockchain network according to some embodiments.

In some embodiments, the data storage solution may be applied to the data storage system based on the blockchain network shown in FIG. 1C. As shown in FIG. 1C, the data storage system based on the blockchain network may include, but is not limited to: a node device (such as a consensus node 101 and a storage node 102) and a target device 103 in the blockchain network. The quantity and type of each node device (for example, the consensus node 101 and the storage node 102) and the target device 103 are not limited in herein. For example, in FIG. 1C, the quantity of consensus nodes 101 is four, and the quantity of storage nodes 102 is two. However, in some embodiments, the quantity of consensus nodes 101 may be greater than four (for example, 100), and the quantity of storage nodes 102 may be greater than two (for example, 50). In another example, the target device 103 may refer to a user terminal, a terminal device, or the like, and the target device may include, but is not limited to, a smart device such as a smart phone, a tablet computer, a portable personal computer, a mobile internet device, a smart TV, an in-vehicle device, and a headset device. The node device (such as the consensus node 101 and the storage node 102) may refer to a server with relatively large storage space and relatively strong computing capabilities, and the server may include, but is not limited to: a data processing server, a web server, an application server, and another device with complex computing capabilities. The target device and the server (such as a consensus node and a storage node) may be directly or indirectly connected through wired or wireless communication, and a connection manner between the target device and the server is not limited herein.

The data storage solution based on the blockchain network mentioned in some embodiments may be jointly performed by the target device 103, the consensus node 101, and the storage node 102 in the data storage system shown in FIG. 1C, and the consensus node 101 includes the blockchain. For a general process of the data storage solution, reference may be made to FIG. 1C. As shown in FIG. 1C: ① The target user may transmit a storage request to the target storage node 102 (such as any storage node 102) by using the target device 103, and the storage request carries multimedia data (such as data such as files, audio and video, images, or the like); the target storage node 102 receives the storage request transmitted by the target device 103, and stores the multimedia data in the local space of the target storage node 102 in response to the storage request, and generates a target storage proof based on the multimedia data. The target storage proof may be used for proving (or indicating) that the target storage node has stored the multimedia data; and the target storage node 102 further transmits the target storage proof to the consensus node 101 (such as any consensus node, or a consensus node closest to the target storage node, or a consensus node dedicated to receiving the storage proof, or the like). ② The consensus node 101 receives the target storage proof transmitted by the target storage node 102, and adds the target storage proof to the blockchain on the consensus node in the form of blocks, so as to upload the target storage proof to the blockchain. ③ The target user may transmit an uploading request to the consensus node 101 through the target device 103, and the upload request is used for requesting the consensus node 101 to upload the data identifier of the multimedia data. ④ After receiving the uploading request transmitted by the target device 103, the consensus node 101 performs consensus verification on the multimedia data uploading request, and stores the data identifier of the multimedia data in the blockchain in the form of blocks after the consensus verification succeeds, so as to upload the data identifier of the multimedia data to the blockchain; and the data identifier in the blockchain may indicate that the multimedia data is successfully stored in the blockchain network. A description is made by using an example in which the target device 103 does not belong to the node device in the blockchain network, but it may be understood that the target device 103 may also be used as a node device in the blockchain network, which is not described in detail herein.

In some embodiments, a storage node (such as a target storage node) is introduced into the blockchain network, and the storage node is responsible for storing the multimedia data, so that the target storage proof generated based on the multimedia data is transmitted to the consensus node, and the consensus node stores the data identifier of the multimedia data in the blockchain of the consensus node. The data identifier in the blockchain may be used for representing that the multimedia data indicated by the data identifier has been stored in the blockchain network. In the process, a target storage node independent of the consensus node may be used for storing the multimedia data with a relatively large data volume, and only the data identifier with a relatively small data volume may be stored in the blockchain. The manner that separately stores the multimedia data and the data identifier may improve the security of the multimedia data to a certain extent, and may effectively reduce the storage pressure of the blockchain compared with storing the multimedia data in the blockchain, thereby reducing the storage pressure of the consensus node and improving the operation efficiency and stability of the consensus node.

Based on the described data storage solution based on the blockchain network, some embodiments provide a more detailed data storage method based on a blockchain network. The data storage method based on the blockchain network provided in some embodiments is described in detail below with reference to the accompanying drawings.

FIG. 2 is a schematic flowchart of a data storage method based on a blockchain network according to some embodiments. The data storage method may be performed by the target storage node (that is, any storage node) in the system shown in FIG. 1C, and the data storage method includes, but is not limited to, S201 to S203:

S201. Receive a storage request transmitted by a target device.

The target device may refer to a device used by a target user, such as a smart phone, a personal computer, or the like; and when the target user has the need to store the multimedia data to the blockchain network, the target user may transmit a storage request to the target storage node by using the target device. The storage request carries multimedia data, so that after receiving the storage request, the target storage node stores the multimedia data in response to the storage request. The multimedia data may include, but is not limited to, data such as images, files, audio, and video, and the type of multimedia data is not limited herein.

Figures 3, 4:
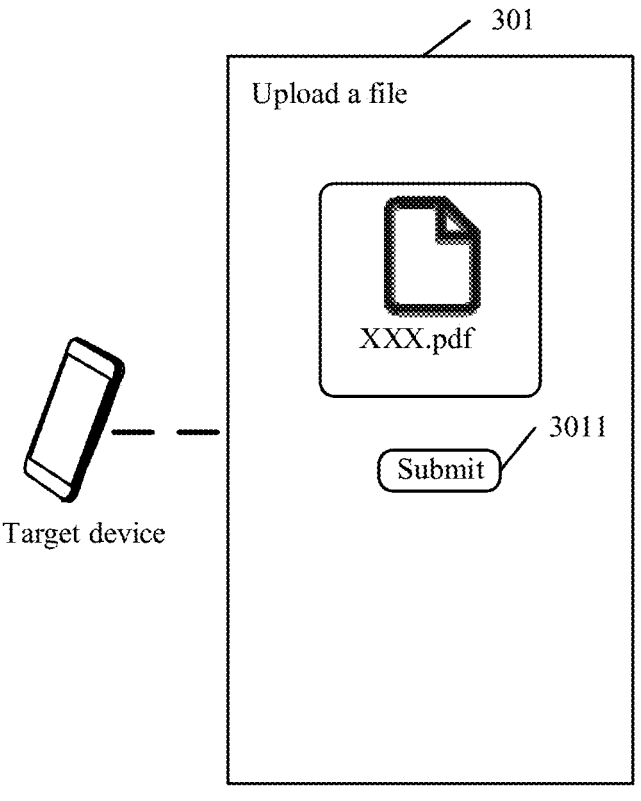
FIG. 3 is a schematic diagram of an interface for uploading multimedia data according to some embodiments.
FIG. 4 is a schematic diagram of a storage node being built by a plurality of parties according to some embodiments.

For some embodiments in which the target user transmits the multimedia data to a target storage node through a target device, reference may be made to FIG. 3. As shown in FIG. 3, an uploading interface 301 is displayed on a terminal screen of the target device, and the target user may upload the to-be-stored multimedia data in the uploading interface 301, such as the uploaded to-be-stored multimedia data being a file; and the uploading interface 301 includes a submit option 3011. When the submit option 3011 is triggered, the target device generates a storage request based on the multimedia data, and transmits the storage request to the target storage node. It may be understood that a style of the uploading interface 301 and a process of uploading the multimedia data shown in FIG. 3 are exemplary. In some embodiments, the style of the uploading interface 301 and the process of uploading the multimedia data may be changed, which are described herein.

In some embodiments, a node type of the target storage node may be different. In some embodiments, a node type of the target storage node may be a first node type or a second node type. The first node type refers to a node type that requires at least two storage nodes to jointly maintain one piece of data, and the second node type refers to a node type that requires one storage node to independently maintain one piece of data.

S202. Store the multimedia data in a local space of the target storage node, and generate a target storage proof of the multimedia data.

After receiving the storage request transmitted by the target device, the target storage node may respond to the storage request and store the multimedia data carried in the storage request in the local space of the target storage node. In some embodiments, according to different service requirements, before storing the multimedia data in the local space, the target storage node may further perform legality verification on the multimedia data, and only after the verification succeeds, perform the operation of storing the multimedia data in the local space. The so-called legality verification may include the following: ① It is verified whether a data format of the multimedia data meets a requirement for the data format imposed by the target storage node (or blockchain network); and for example, the data format of the data stored in the target storage node is a file format, and when a format of the multimedia data is a table format, it is determined that the verification performed on the multimedia data fails. That is, the multimedia data cannot be stored in the local space of the target storage node. ② It is verified whether the multimedia data is legal or ethical data; and for example, it is verified whether the multimedia data includes violent data, false information, or the like, and when it is detected that the multimedia data includes illegal data or information that violates morality, it is determined that the verification performed on the multimedia data fails. ③ It is verified whether a source of the multimedia data is in line with rules; and for example, the data stored in the blockchain should all come from a company A. When the multimedia data comes from a company B, it is determined that the verification performed on the multimedia data fails. That is, the multimedia data cannot be stored in the local space of the target storage node, or the like. Several types of legality verification are exemplarily enumerated in the above, and a verification manner of the target storage node performed on the multimedia data is not limited herein, which is described herein.

For example: it is assumed that the blockchain network is a network about bill storage, that is, only data related to bills is stored in the blockchain, such as invoice data, billing party data, or the like; after the target storage node receives the multimedia data, the target storage node may detect whether the multimedia data is data related to bills, such as detecting whether the multimedia data is the invoice data; and if the multimedia data is not the data related to the bill, the target storage node does not store the multimedia data, that is, the storage fails. On the contrary, if the multimedia data is the data related to the bill, the target storage node stores the multimedia data, that is, the storage succeeds.

After receiving the storage request transmitted by the target device, the target storage node further responds to the storage request, and generates a target storage proof of the multimedia data based on the multimedia data carried in the storage request; and the target storage proof is similar to a proof certificate. If the target storage node has the target storage proof, it indicates that the target storage node has successfully stored the multimedia data. A manner for the target storage proof to generate the target storage proof of the multimedia data may include, but is not limited to: obtaining the data identifier of the multimedia data, and obtaining the node identifier of the target storage node; generating the target storage proof of the multimedia data based on the data identifier of the multimedia data and the node identifier of the target storage node; and in this way, the target storage proof may include the data identifier of the multimedia data and the node identifier of the target storage node.

The node identifier of the target storage node may be an IP address and any other information that may be used for identifying the target storage node (such as a unique identifier code allocated by the target storage node (or a target storage node device) when the target storage node leaves the factory, or a unique identifier code allocated to the target storage node device when the target storage node is newly added to the blockchain network, or the like); and the node identifier of the target storage node may be used for uniquely identifying the target storage node, that is, a unique target storage node having a corresponding relationship with the node identifier may be found according to the node identifier. In some embodiments, the data identifier of the multimedia data may also be used for uniquely identifying the multimedia data, that is, the unique multimedia data corresponding to the data identifier may be queried according to the data identifier. The manner of determining the data identifier of the multimedia data may include, but is not limited to: performing data analysis on the multimedia data to obtain data attribute information of the multimedia data; and performing a hash operation on the data attribute information to obtain the data identifier of the multimedia data, or directly using the data attribute information of the multimedia data as the data identifier of the multimedia data. A hash algorithm may include, but is not limited to: a Message Digest 4 (MD4) algorithm, a Message Digest 5 (MD5) algorithm, a Secure Hash Algorithm 1 (SHA1) algorithm, or the like. Which hash algorithm is specifically used is not limited herein.

In some embodiments, it is determined which of the manners is used to determine the data identifier of the multimedia data according to whether the data attribute information may uniquely identify the multimedia data. For example, if the multimedia data is transaction data, the data attribute information of the multimedia data may include an order number of the transaction. The order number may uniquely identify the transaction data, and therefore, the order number may be directly used as the data identifier of the multimedia data. In another example, if the multimedia data is text, the data attribute information of the multimedia data may include a text name of the text. The text name cannot uniquely identify the text, for example, there are two texts with the same name, or the like, and therefore, a hash operation may be performed on the text name of the text to obtain the data identifier of the multimedia data.

In a case that the data attribute information of the multimedia data cannot uniquely identify the multimedia data, the target storage node performs data analysis on the multimedia data, and, in some embodiments, obtaining the data attribute information of the multimedia data may include at least one of the following: ① Feature extraction processing is performed on the multimedia data to obtain data features of the multimedia data, and the data features are added to the data attribute information of the multimedia data, where according to different types of multimedia data, the manners of performing feature extraction on the multimedia data are also different; for example, if the multimedia data is an image, then feature extraction may be performed on color, shape, or boundary of the image to obtain the corresponding data features; and in another example, if the multimedia data is audio, frequency domain feature extraction and energy feature extraction may be performed on the audio, or the like. ② Keyword extraction processing is performed on the multimedia data to obtain keyword information of the multimedia data, and the keyword information is added to the data attribute information of the multimedia data; in some embodiments, a plurality of candidate words in the multimedia data may be determined, and a relatively important word may be determined as the keyword information from the plurality of candidate words, thereby implementing the extraction on the keyword information of the multimedia data; and for example, when the multimedia data is audio, the keyword information may be determined from the audio information (such as audio name, memory, time, or the like) of the audio. ③ In a case that the multimedia data is text, digest extraction processing is performed on the multimedia data to obtain digest information of the multimedia data, and the digest information is added to the data attribute information of the multimedia data. The so-called digest extraction processing may refer to a process of performing processing on the text, including simplifying and refining the text content to obtain the central content of the text. The digest information of the text may express the main content of the text to a certain extent. In summary, the data attribute information of the multimedia data may be obtained after performing processing on the multimedia data, and the data attribute information may include: data features of the multimedia data, keyword information of the multimedia data, and digest information of the multimedia data. However, it is not difficult to understand that the data attribute information of the multimedia data may further be carried by the storage request and directly transmitted by the target device to the target storage node; and for example, if the multimedia data is transaction data, the data attribute information of the multimedia data may include an order number, and the order number may be included in the storage request and be directly transmitted by the target device to the target storage node, or the like.

A process of determining the data identifier of the multimedia data described above is performed by the target storage node. However, in some embodiments, the process of determining the data identifier of the multimedia data may also be performed by the target device. In this way, a process of performing calculation on the data identifier of the multimedia data by the target storage node may be omitted, the requirement on the computing capability of the target storage node is reduced, and the storage efficiency of the target storage node is improved. An execution entity for determining the data identifier of the multimedia data is not limited herein.

In addition, if the blockchain network includes a plurality of storage nodes, some embodiments further support synchronization of the multimedia data between storage nodes. In this way, distributed storage may be performed on the multimedia data in the blockchain network to implement the backup of the multimedia data, where peer-to-peer lending (P2P) links may be used between storage nodes to transmit the multimedia data, so as to improve the synchronization efficiency of the multimedia data. In some embodiments, if the blockchain network includes N storage nodes under a first node type, N is an integer greater than 1, and the target storage node is a storage node among the N storage nodes, the first node type refers to: a node type that requires at least two storage nodes to jointly maintain one piece of data, that is, a node type that requires a plurality of storage nodes to synchronously store any piece of data; then, after the target storage node receives the multimedia data transmitted by the target device, the target storage node may select M reference storage nodes from the remaining storage nodes, where M∈[1, N−1], and the remaining storage nodes are storage nodes other than the target storage node among the N storage nodes; and synchronize the multimedia data to the M reference storage nodes, to cause each reference storage node in the M reference storage nodes, after storing the multimedia data, to transmit a reference storage proof about the multimedia data to the consensus node, and to cause the consensus node, after receiving the uploading request, to perform consensus verification on the multimedia data according to the target storage proof and the reference storage proof transmitted by each reference storage node. A specific value of M may be set by the administrator according to service requirements, and the specific value of M is not limited herein.

When the node type of the target storage node is the first node type, the target storage node may be understood as a type of multi-center storage node, that is, there are a plurality of storage nodes in the blockchain network used for synchronously storing the same data. In some embodiments, synchronously storing the multimedia data by the plurality of storage nodes under the first node type described above is suitable for an application scenario in which storage of the multimedia data is maintained by a plurality of parties. In some embodiments in which a plurality of parties jointly maintain the storage of the multimedia data, each party involved in the storage of the multimedia data may respectively build one or more storage nodes to store the multimedia data. In addition, a P2P link manner may be used for synchronizing the multimedia data between the plurality of storage nodes of a plurality of parties or between the plurality of storage nodes of any party. A scenario in which a plurality of parties jointly maintain the storage of the multimedia data is described below with reference to a scenario of bill storage shown in FIG. 4 as an example. As shown in FIG. 4, in an application scenario of bill storage, a tax bureau, a billing party, and a user side are involved, then the tax bureau and the billing party may be the two parties that maintain the storage of the multimedia data, and the tax bureau and the billing party may respectively build storage nodes to store invoices; for example, the tax bureau builds a storage node 1, a storage node 2, a storage node 3, and a storage node 4, and the billing party builds a storage node 5 and a storage node 6; and when any storage node (such as the storage node 1) built by the tax bureau receives the multimedia data (that is, an invoice), the any storage node may synchronize the multimedia data to other storage nodes built by the tax bureau and storage nodes built by the billing party, so as to implement distributed storage of the multimedia data by each storage node.

FIG. 4 shows a schematic diagram of a storage node being built by a plurality of parties according to some embodiments. In some embodiments, the target device transmits the multimedia data to the storage node 1. However, in some embodiments, the target device may be to transmit the multimedia data to other storage nodes (such as the storage node 5) other than the storage node 1; and in addition, after receiving the multimedia data, the storage node 1 may selectively synchronize the multimedia data to some storage nodes of the tax bureau or part of the storage nodes of the billing party, such as only synchronizing the multimedia data to the storage node 2 and the storage node 4 of the tax bureau. In addition, some embodiments further supports that after the storage node 1 synchronizes the multimedia data to any reference storage node (such as the storage node 4), the any reference storage node continues to synchronize the multimedia data to other reference storage nodes; and based on this, the manner of synchronizing the multimedia data between storage nodes is not limited herein.

In addition, levels of each party that builds the storage nodes may be different, and therefore, the quantity and level of the storage nodes built by each party and the quantity of storage nodes used for storing a specific type of multimedia data may be different according to the different levels; and the level may refer to priority of storing the multimedia data. For example, a storage node with a higher level may preferentially store the multimedia data compared with a storage node with a relatively low level. In some embodiments, the level may further be defined as other meanings, which is not described in detail herein. In some embodiments, in which a company 1, a company 2, and a company 3 jointly maintain the storage of the multimedia data, the higher the level of a company, the higher the level of storage nodes built by the company, the more storage nodes the company may build, the more storage nodes that may be used for storing the target multimedia data (for example, any multimedia data). Currently, it is assumed that a level of the company 1>a level of the company 2>a level of the company 3, then it may be determined that the quantity and level of storage nodes built by the company 1>the quantity and level of storage nodes built by the company 2>the quantity and level of storage nodes built by the company 3, and the quantity of storage nodes used for storing the target multimedia data by the company 1>the quantity of storage nodes used for storing the target multimedia data by the company 2>the quantity of storage nodes used for storing the target multimedia data by the company 3. Based on the division of levels, each storage node in the blockchain network may correspond to a level.

A manner of dividing levels by the parties involved in storing the multimedia data may better meet some service requirements and provide more abundant application scenarios.

S203. Transmit a target storage proof to a consensus node.

After generating the target storage proof about the multimedia data, the target storage node may further transmit the target storage proof to the consensus node, to cause the consensus node, after receiving an uploading request about the multimedia data transmitted by the target device, to perform consensus verification on the multimedia data according to the target storage proof, and store a data identifier of the multimedia data in the blockchain of the consensus node after the multimedia data passes the consensus verification; the data identifier in the blockchain being used for indicating that the multimedia data is successfully stored in the blockchain network.

In some embodiments, after the target storage node successfully transmits the target storage proof to the consensus node, the target storage node may further return a notification message to the target device. The notification message is used for notifying the target user that the multimedia data has been successfully stored in the blockchain network, and that the data identifier of the multimedia data has been successfully transmitted to the consensus node. For a schematic diagram of an interface when the target device receives the notification message, reference may be made to FIG. 5. As shown in FIG. 5, when the target device receives the notification message 501 transmitted by the target storage node, the target device may output the notification message 501 on the terminal screen of the target device. The notification message 501 may be, for example, "multimedia data has been successfully stored", and specifically, the notification message 501 may be displayed in the uploading interface 301; and a display position and a display manner of the notification message are not limited herein.

In some embodiments, the target device transmits a storage request to the target storage node, and the target storage node stores the multimedia data carried by the storage request to the target storage node in response to the storage request; and the target storage node further generates a target storage proof about the multimedia data, and transmits the target storage proof to the consensus node, so that the consensus node can store the data identifier about the multimedia data to the blockchain on the consensus node after the consensus verification on the multimedia data succeeds. In this way, the data identifier in the blockchain indicates that the blockchain network has successfully stored the multimedia data. In the process, a target storage node independent of the consensus node may be used for storing the multimedia data with a relatively large data volume, and only the data identifier with a relatively small data volume may be stored in the blockchain. The manner that separately stores the multimedia data and the data identifier may improve the security of the multimedia data to a certain extent, and may effectively reduce the storage pressure of the blockchain compared with storing the multimedia data in the blockchain, thereby reducing the storage pressure of the consensus node and improving the operation efficiency and stability of the consensus node.

FIG. 6 is a schematic flowchart of another data storage method based on a blockchain network according to some embodiments. The data storage method may be performed by the consensus node in the system shown in FIG. 1C, and the data storage method includes, but is not limited to, S601 to S603:

S601. Receive an uploading request about multimedia data transmitted by a target device.

The uploading request transmitted by the target device is used for requesting the consensus node to store the data identifier of the multimedia data in the blockchain. The uploading request may carry the data identifier of the multimedia data. The data identifier may be generated by the target device, or returned to the target device after the target storage node is generated. In this way, after receiving the uploading request transmitted by the target device, the consensus node may obtain the data identifier of the multimedia data by parsing the uploading request. In some embodiments, the uploading request may not carry the data identifier of the multimedia data, but only carry the multimedia data. In this way, after receiving the uploading request, the consensus node may use the same generation policy as the target storage node (or target device) to generate the data identifier of the multimedia data to perform operation on the multimedia data, to obtain the data identifier of the multimedia data; and for example, if the target storage node performs a hash operation on the data attribute information of the multimedia data to obtain the data identifier of the multimedia data, then the consensus node may also perform the same hash operation on the data attribute information of the multimedia data carried in the uploading request to obtain the data identifier of the multimedia data.

S602. Obtain a target storage proof about the multimedia data.

The target storage proof is generated by the target storage node after receiving the storage request transmitted by the target device and transmitted to the consensus node. The consensus node may store the target storage proof in the blockchain of the consensus node; and the target storage proof is used for proving that the target storage node has stored the multimedia data. In some embodiments, after the consensus node receives the uploading request about the multimedia data transmitted by the target device, the consensus node may obtain the data identifier of the multimedia data based on various implementations of S601. Then, the consensus node may query whether there is a target storage proof matching the data identifier from the blockchain according to the data identifier of the multimedia data. If the target storage proof of the multimedia data has been stored in the blockchain before the consensus node performs the operation of querying the target storage proof according to the data identifier, that is, after the consensus node stores the target storage proof in the blockchain, the target device transmits the uploading request to the consensus node, then, the consensus node may query the target storage proof about the multimedia data according to the data identifier. If the target storage proof of the multimedia data is not stored in the blockchain before the consensus node performs the operation of querying the target storage proof according to the data identifier, for example, before the target device transmits the storage request to the target storage node, or before the consensus node stores the target storage proof in the blockchain, the target device transmits the uploading request to the consensus node, then, the consensus node may not query the target storage proof related to the data identifier from the blockchain according to the data identifier of the multimedia data carried by the uploading request. In this case, the consensus node may return prompt information of the query failure to the target device, so that the target device may prompt the user that the data identifier of the multimedia data fails to be uploaded to the blockchain.

S603. Perform consensus verification on the multimedia data according to the target storage proof, and store a data identifier of the multimedia data in the blockchain of the consensus node after the multimedia data passes the consensus verification.

In some embodiments, the consensus node may perform consensus verification on the multimedia data according to the target storage proof according to a consensus verification policy.

The consensus verification policy may refer to a verification method (or logic) for performing consensus verification on the multimedia data according to the target storage proof; and the consensus verification policy may be set by management personnel according to service requirements. The consensus verification policy may be stored in the blockchain in the form of a smart contract, and the smart contract may also refer to a proof contract; and when the consensus node needs to perform consensus on the multimedia data, the consensus node may obtain the consensus verification policy from the blockchain, so as to perform consensus verification on the multimedia data according to the consensus verification policy. The manner of storing the consensus verification policy in the form of a smart contract is conducive to expanding and updating the smart contract at any time, and the operation is simple and convenient. In some embodiments, the consensus verification policy may also be embedded in an operating system of the consensus node. In other words, programming is performed on the consensus verification policy, and an obtained program is encoded into the operating system of the consensus node. In this way, the consensus verification logic of the consensus node is integrated with the consensus, which may improve the performance of consensus verification, has a wide range of applicability, and may support a non-Turing complete blockchain (that is, a device that does not support the smart contract).

In some embodiments, a process in which the consensus node performs consensus verification on the multimedia data according to the target storage proof may include the following: the consensus node obtains the node type of the target storage node, and the node type is the first node type or the second node type; the first node type refers to a node type that requires at least two storage nodes to jointly maintain one piece of data, and the second node type refers to a node type that requires one storage node to independently maintain one piece of data; if the node type is the first node type, the quantity of storage proofs about the multimedia data stored in the blockchain is calculated, and if the calculated quantity is greater than a quantity threshold, it is determined that the multimedia data passes the consensus verification; and otherwise, if the node type is the second node type, it is determined that the multimedia data passes the consensus verification.

For a specific description of the first node type, reference may be made to the related description shown in S202 in the embodiment shown in FIG. 2, which is not repeated herein. The target storage node under the second node type may be understood as a strong central storage node; and when the node type of the target storage node is the second node type, in some embodiments, performing verification on the multimedia data by the target storage node under the second node type described above is suitable for an application scenario with an authoritative party. The authoritative party may refer to a core enterprise or a third-party data hosting institution. In the application scenario, the authoritative party is responsible for building the storage node and is responsible for storing the multimedia data. The manner of storing the multimedia data by an authoritative party may ensure the security and privacy of the multimedia data to a certain extent. The authoritative party may build only one storage node to store the multimedia data, and the authoritative party may also build a plurality of storage nodes to expand the storage memory to store the multimedia data, but the ownership of the plurality of storage nodes belongs to the authoritative party. For example, in a scenario of bill storage, which involves the tax bureau, the billing party, and the user party, the tax bureau may be the authoritative party responsible for building the storage node and be responsible for storing the multimedia data.

Based on the foregoing description, it is learnt that according to the different node types of the target storage nodes, manners of performing consensus verification on the multimedia data by the consensus node are also different. If the node type of the target storage node is the second node type, it indicates that the target storage node is a strong central storage node, that is, only the strong central storage node needs to store the multimedia data in the blockchain, then, when the consensus node obtains the target storage proof from the blockchain, it indicates that the strong central storage node has successfully stored the multimedia data, and it may be determined that consensus verification performed on the multimedia data by the consensus node succeeds. When the node type of the target storage node is the first node type, it indicates that the target storage node is a multi-center storage node, that is, the data in the blockchain network needs storage nodes built by a plurality of parties to jointly maintain. In other words, there are further storage nodes whose ownership belongs to other units (or enterprises, individuals, or the like) in the blockchain network; and in the implementation, the consensus node needs to verify whether there are storage nodes with a quantity threshold of storage nodes in other storage nodes in the blockchain network storing the multimedia data. Only when the quantity of storage nodes storing the multimedia data is greater than a data threshold, it indicates that all parties store the multimedia data, and then it is determined that the multimedia data passes the consensus verification.

As related description in the embodiment shown in FIG. 2, when the node type of the target storage node is the first node type, the target storage node may synchronize the multimedia data to the reference storage node, so that the reference storage node generates the reference storage proof about the multimedia data, and transmits the reference storage proof to the consensus node, and so that the consensus node stores the reference storage proof in the blockchain, so as to perform consensus verification on the multimedia data according to the target storage proof and the reference storage proof transmitted by each reference storage node; and then, when the consensus node performs consensus verification on the multimedia data, a process in which the consensus node performs verification on the quantity of storage nodes storing the multimedia data may be implemented by calculating the quantity of storage proofs about the multimedia data stored in the blockchain. For example, if the consensus node calculates five storage proofs about the multimedia data in the blockchain according to the data identifier of the multimedia data, including the target storage proof and the reference storage proof, it may be determined that the target storage node and the four reference storage nodes in the blockchain network store the multimedia data.

The quantity threshold mentioned above may be a fixed value set by management personnel according to service requirements; and for example, the quantity threshold set by the management personnel according to the service requirements of a specific service is 3, and there are five storage nodes in the blockchain network. Then, when the quantity of storage proofs about the multimedia data calculated by the consensus node from the blockchain is four, it indicates that there are four storage nodes in the blockchain network to store the multimedia data, and it is determined that the consensus verification performed on the multimedia data succeeds. In addition, according to the related description shown in S202 in the embodiment shown in FIG. 2, it is learnt that each storage node included in the blockchain network may further be divided into different levels; and then, the quantity threshold may further be determined according to the quantity of storage nodes at different levels. In some embodiments, the consensus node obtains one or more storage proofs about the multimedia data from the blockchain according to the data identifier, and obtains the level of the storage node indicated by the one or more storage proofs; the consensus node calculates the quantity of storage nodes at different levels; and if the quantity of storage nodes at different levels is greater than the quantity threshold corresponding to the level, it is determined that consensus verification performed on the multimedia data succeeds.

For example, it is assumed that the blockchain network includes: a storage node A and a storage node B at a level 1, a storage node C, a storage node D, and a storage node E at a level 2, a storage node F and a storage node G at a level 3; the quantity thresholds of the storage proofs that are set include: a quantity threshold of a storage proof transmitted by a storage node at the level 1 is 1, a quantity threshold of a storage proof transmitted by a storage node at the level 2 is 1, and a quantity threshold of a storage proof transmitted by a storage node at the level 3 is 1; the current consensus node obtains from the blockchain according to the data identifier: a storage proof 1 transmitted by a storage node A, a storage proof 2 transmitted by a storage node B, a storage proof 3 transmitted by a storage node C, a storage proof 4 transmitted by a storage node D, a storage proof 5 transmitted by a storage node F, and a storage proof 6 transmitted by a storage node G; and then, it is determined that the quantity of storage proofs obtained by the consensus node is six, the quantity 2 of storage proofs transmitted by the storage node at the level 1>the quantity threshold 1 of storage proofs transmitted by the storage node at the level 1, the quantity 2 of storage proofs transmitted by the storage node at the level 2>the quantity threshold 1 of storage proofs transmitted by the storage node at the level 2, and the quantity 2 of storage proofs transmitted by storage nodes at the level 3>the quantity threshold 1 of storage proofs transmitted by the storage node at the level 3, then it is determined that the quantity of storage proofs corresponding to the storage nodes at different levels is greater than the quantity threshold corresponding to each level, that is, it is determined that consensus verification performed on the multimedia data by the consensus node succeeds.

It may be understood that, in addition to detecting whether the quantity of storage proofs is greater than the quantity threshold by using what is described above to determine whether the multimedia data passes the consensus verification, some embodiments further support determining whether the multimedia data passes the consensus verification by calculating whether a storage evaluation score of the multimedia data is greater than a score threshold. In some embodiments, the consensus node obtains one or more storage proofs about the multimedia data from the blockchain according to the data identifier, and obtains the level of the storage node indicated by the one or more storage proofs; the consensus node performs weighted sum operation on the quantity of storage proofs corresponding to storage nodes at different levels to obtain the storage evaluation score of the multimedia data; and if the storage evaluation score is greater than the score threshold, it is determined that consensus verification performed on the multimedia data succeeds.

For example, it is assumed that the blockchain network includes: a storage node A and a storage node B at a level 1, a storage node C, a storage node D, and a storage node E at a level 2, a storage node F and a storage node G at a level 3; a score threshold is set to 1.8, a weight of the level 1 is set to 40%, a weight of the level 2 is set to 20%, and a weight of the level 3 is set to 40%; the current consensus node obtains from the blockchain according to the data identifier: a storage proof 1 transmitted by a storage node A, a storage proof 2 transmitted by a storage node B, a storage proof 3 transmitted by a storage node C, a storage proof 4 transmitted by a storage node D, a storage proof 5 transmitted by a storage node F, and a storage proof 6 transmitted by a storage node G; and then, it is determined that the quantity of storage proofs obtained by the consensus node is six, and weighted sum operation is performed on the quantity of storage proofs corresponding to storage nodes at three levels to obtain the storage evaluation score of the multimedia data=2*40%+2*20%+2*40%=2. If the storage evaluation score 2 of the multimedia data>the score threshold 1.8, it is determined that consensus verification performed on the multimedia data by the consensus node succeeds.

The several consensus verification manners for the multimedia data provided above are all exemplary, and other consensus verification manners are also applicable to some embodiments. In addition, based on the foregoing description, it is learnt that a process in which the consensus node performs consensus verification on the multimedia data and a process in which the consensus node stores the storage proof in the blockchain are two relatively independent processes; based on this, in a preset time period, when the consensus node calculates at a first moment (such as any moment) that the quantity of storage proofs about the multimedia data is less than or equal to the quantity threshold, the consensus node may only determine that consensus verification performed on the multimedia data fails at the first moment; and the consensus node may further calculate the quantity of storage proofs of the multimedia data again at a second moment, and determine whether the quantity of storage proofs of the multimedia data is greater than the quantity threshold until the preset time period ends, where the second moment is located after the first moment in the preset time period.

In some embodiments, the consensus node receives the target storage proof about the multimedia data, and after the consensus performed on the multimedia data succeeds, the consensus node stores the data identifier of the multimedia data in the blockchain. The data identifier in the blockchain is used for indicating that the multimedia data is successfully stored in the blockchain network. In the process, a target storage node independent of the consensus node may be used for storing the multimedia data with a relatively large data volume, and only the data identifier with a relatively small data volume may be stored in the blockchain. The manner that separately stores the multimedia data and the data identifier may improve the security of the multimedia data to a certain extent, and may effectively reduce the storage pressure of the blockchain compared with storing the multimedia data in the blockchain, thereby reducing the storage pressure of the consensus node and improving the operation efficiency and stability of the consensus node.

Figure 7:
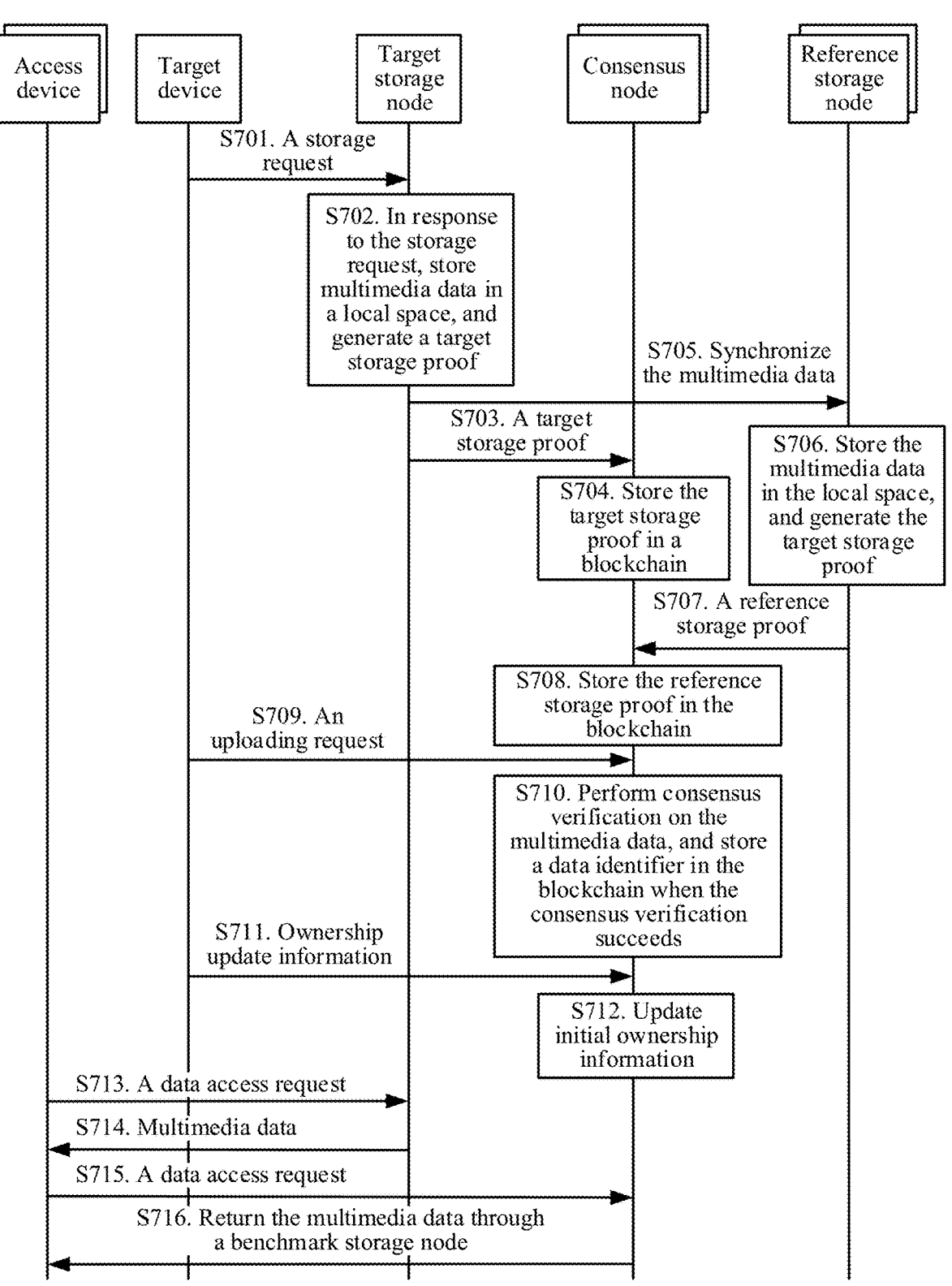
FIG. 7 is a schematic flowchart of still another data storage method based on a blockchain network according to some embodiments.

FIG. 7 is a schematic flowchart of still another data storage method based on a blockchain network according to some embodiments. The data storage method may be jointly performed by the target device, the storage node, and the consensus node in the system shown in FIG. 1C, and the data storage method includes, but is not limited to, S701 to S716:

S701. A target device transmits a storage request to a target storage node.

S702. In response to the storage request, the target storage node stores the multimedia data in the local space of the target storage node, and generates a target storage proof about the multimedia data.

S703. The target storage node transmits a target storage proof to a consensus node.

S704. The consensus node receives the target storage proof transmitted by the target storage node, and stores the target storage proof in the blockchain.

S705. The target storage node synchronizes the multimedia data to the reference storage node. S706. The reference storage node receives the multimedia data transmitted by the target storage node, stores the multimedia data in the local space of the reference storage node, and generates a reference storage proof about the multimedia data.

S707. The reference storage node transmits a reference storage proof to a consensus node.

S708. The consensus node stores the reference storage proof in the blockchain.

S709. The target device transmits an uploading request to the consensus node.

S710. The consensus node performs consensus verification on the multimedia data in response to the uploading request, and when the consensus verification succeeds, stores the data identifier of the multimedia data in the blockchain.

For some embodiments process shown in S701 to S710, reference may be made to S201 to S203 in the embodiment shown in FIG. 2 and the related descriptions of some embodiments process shown in S601 to S603 in the embodiment shown in FIG. 6, which is not repeated herein. In addition, execution orders of S703 to S704 and S705 to S708 are not limited herein; in other words, the target storage node may first transmit the target storage proof to the consensus node, to cause the consensus node to upload the target storage proof to the blockchain, and then synchronize the multimedia data to the reference storage node, to cause the reference storage node to store the multimedia data; or the target storage proof may first synchronize the multimedia data to the reference storage node, to cause the reference storage node to store the multimedia data, and then transmit the target storage proof to the consensus node, to cause the consensus node to upload the target storage proof to the blockchain; or the target storage node may further simultaneously perform the operation of transmitting the target storage proof to the consensus node and synchronizing the multimedia data to the reference storage node.

S711. The target device transmits ownership update information to the consensus node.

S712. The consensus node receives the ownership update information transmitted by the target device, and updates the initial ownership information according to the ownership update information.

In S711 to S712, ownership information about the multimedia data is stored in the blockchain of the consensus node, and the ownership information includes: one or more device identifiers with access permissions to access the multimedia data; and for the convenience of subsequent descriptions, in some embodiments, the ownership information stored in the blockchain and is not updated is referred to as initial ownership information. The blockchain stores the initial ownership information, and a process of updating the initial ownership information may include the following: when the consensus node receives the uploading request transmitted by the target device, the consensus node determines that the target device has ownership of the multimedia data, and the consensus node generates the initial ownership information of the multimedia data according to the device identifier of the target device. The initial ownership information includes the device identifier of the target device, and the initial ownership information is stored in the blockchain; and if the consensus node receives ownership update information transmitted by the target device, the consensus node updates the initial ownership information in the blockchain according to the ownership update information. The updating the initial ownership information may include one or more of adding a device identifier with access permission to the multimedia data, replacing an original device identifier with access permission to the multimedia data, and deleting the original device identifier with access permission to the multimedia data; and in this way, the ownership update information may include: one or more of the newly added device identifier, the replaced device identifier, and the deleted device identifier.

In some embodiments, in addition to being generated by the consensus node, the initial ownership information may further be transmitted by the target device to the consensus node. In this case, in addition to the device identifier of the target device, the initial ownership information may further include device identifiers of other devices defined by the target user. In some embodiments, the initial ownership information may also be carried in the storage request when the target device transmits the storage request to the target storage node; and after consensus verification performed on the multimedia data by the consensus node succeeds, when the consensus node uploads the data identifier of the multimedia data to the blockchain, the consensus node also uploads the initial ownership information to the blockchain. Alternatively, the initial ownership information of the multimedia data stored in the blockchain may further be transmitted by the target device to the consensus node or the target storage node at any moment after the target device transmits a storage request to the target storage node. In summary, a process of storing the initial ownership information of the multimedia data in the blockchain is not limited herein.

S713. An access device transmits a data access request to a target storage node.

S714. The target storage node returns the multimedia data to the access device in response to the data access request transmitted by the access device.

In S713 to S714, the target storage node and the reference storage node may store the multimedia data. Some embodiments further support the access device to transmit a data access request to the target storage node (or any reference storage node), where the data access request is used for requesting the target storage node to return the multimedia data; and the access device may be any device. For example, the access device may refer to a target device, and the access device is not limited herein. In some embodiments, the target storage node may receive a data access request transmitted by an access device, where the data access request carries the data identifier of the multimedia data and a device identifier of the access device, and the access device may refer to any device that may communicate with the target storage node; the target storage node may read current ownership information of the multimedia data from the blockchain according to the data identifier of the multimedia data, and the current ownership information includes: a device identifier of a current device with ownership of the multimedia data, and the current device may refer to: a device that owns the ownership of multimedia data when receiving a data access request; and the target storage node performs identifier hit processing on the current ownership information by using the device identifier of the access device, and if a hit succeeds, the target storage node determines that the access device has an access permission to the multimedia data, and returns the multimedia data to the access device. It may be understood that the target device may also be a data access request transmitted to the reference storage node, so that the reference storage node may perform the foregoing operations.

Figure 8:
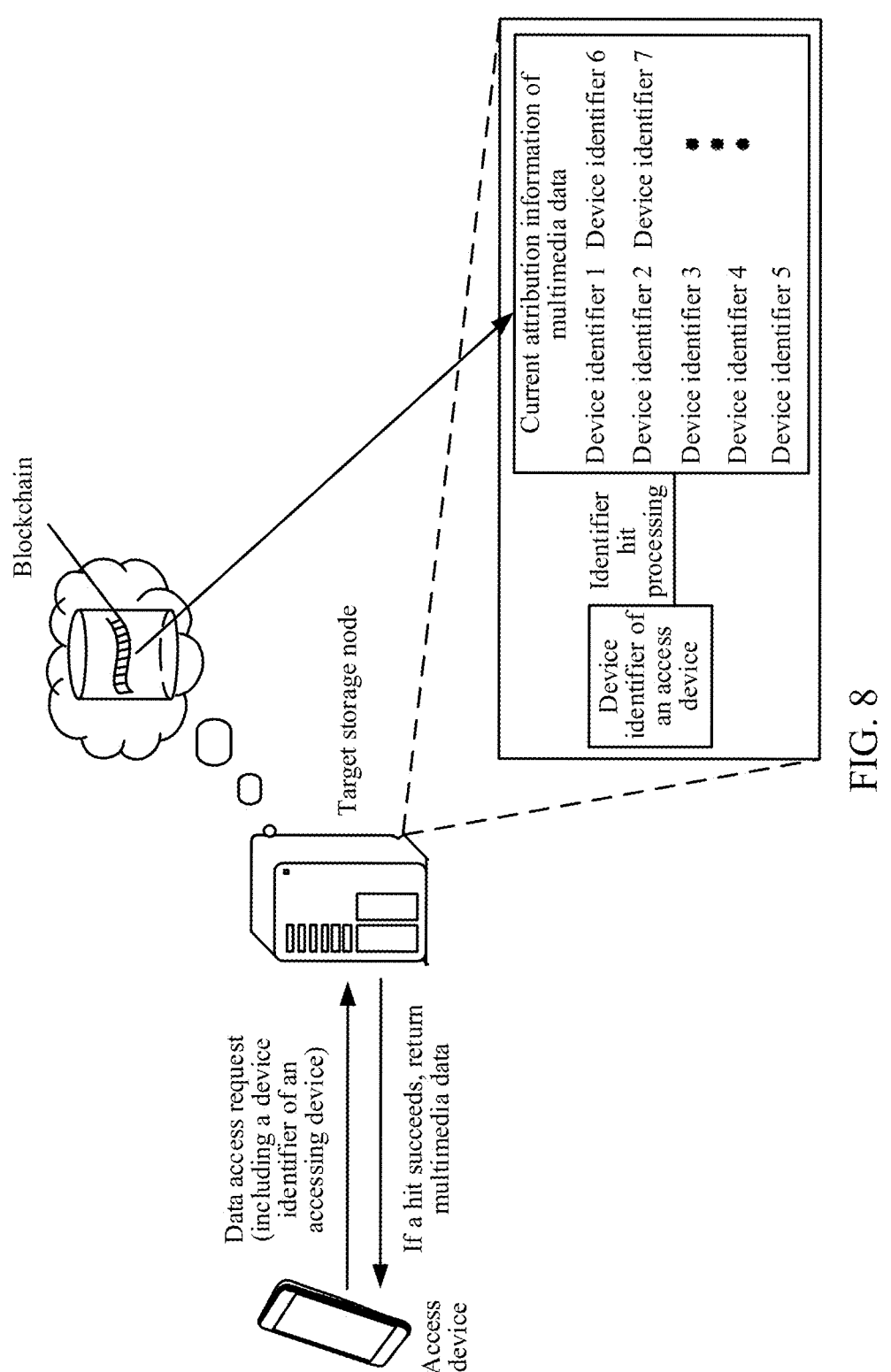
FIG. 8 is a schematic diagram of multimedia data being obtained by an access device according to some embodiments.

A scenario in which the access device requests to obtain the multimedia data described above is briefly described below with reference to the schematic diagram of the scenario shown in FIG. 8. As shown in FIG. 8, the access device may transmit a data access request to the target storage node, and the data access request carries the data identifier of the multimedia data. In this way, after receiving the data access request, the target storage node may obtain the current ownership information of the multimedia data related to the data identifier from the blockchain according to the data identifier carried in the data access request; and the target storage node then performs identifier hit processing according to the device identifier of the access device carried in the data access request and the one or more device identifiers included in the current ownership information. When the device identifier of the access device exists in the current ownership information, it is determined that the device identifier of the access device hits the current ownership information, and it is determined that the hit succeeds. In this case, it indicates that the access device has the permission to access the multimedia data, and the target storage node may return the multimedia data to the access device. The performing hitting on the current ownership information of the multimedia data according to the device identifier of the access device, and performing a return operation on the multimedia data after the hit succeeds may avoid the multimedia data from being illegally stolen and improve the security of the multimedia data.

S715. An access device transmits a data access request to a consensus node.

S716. The consensus node returns the multimedia data to the access device through the benchmark storage node.

In S715 to S716, the consensus node may store the data identifier of the multimedia data in the blockchain of the consensus node. The data identifier in the blockchain may be used for indicating that the multimedia data is successfully stored in the blockchain network. Based on this, some embodiments further supports the access device to transmit a data access request to the consensus node, where the data access request is used for requesting the consensus node to return the multimedia data. In some embodiments, if the blockchain network includes N storage nodes under a first node type, N is an integer greater than 1, and the target storage node is a storage node in the N storage nodes, the multimedia data is synchronously stored in M reference storage nodes among the N storage nodes, and M∈[1, N−1]; and the consensus node may receive a data access request transmitted by an access device, where the data access request carries the data identifier of the multimedia data and a device identifier of the access device; the consensus node reads current ownership information of the multimedia data from the blockchain according to the data identifier. The current ownership information is the latest ownership information stored in the blockchain when a data access request is received, and the current ownership information includes: a device identifier of a current device with ownership of the multimedia data, and the current device refers to: a device that owns the ownership of multimedia data when receiving a data access request; and the consensus node performs identifier hit processing on the current ownership information by using the device identifier of the access device, and if a hit succeeds, the consensus node selects a benchmark storage node from the M reference storage nodes and the target storage node, and transmits the multimedia data to the access device through the benchmark storage node.

The current ownership information of the multimedia data stored in the blockchain is: the ownership information stored in the blockchain when the target storage node receives a data access request. The current ownership information may refer to initial ownership information, or may be ownership information after updating the initial ownership information. Whether the current ownership information is the initial ownership information or the updated initial ownership information is not limited herein.

When the device identifier of the access device successfully hits the current ownership information, it indicates that the access device has the access permission to the multimedia data, and a benchmark storage node may be selected from the M reference storage nodes and the target storage nodes that store the multimedia data, so as to transmit the multimedia data to the access device through the benchmark storage node. From the M reference storage nodes and the target storage node that store the multimedia data, in some embodiments, selecting a benchmark storage node may include, but is not limited to the following: ① A storage node is randomly selected from the M reference storage nodes and the target storage node as the benchmark storage node. In some embodiments, ② a distance between each storage node among the M reference storage nodes and the target storage node and the consensus node is calculated, and a storage node with a shortest distance from the consensus nodes is used as the benchmark storage node; and for example, if M=2, a distance between a reference storage node 1 and the consensus node is 1 km, a distance between a reference storage node 2 and the consensus node is 1.1 km, and a distance between the target storage node and the consensus node is 0.9 km, then, it is determined that the distance between the target storage node and the consensus node is the shortest, and the target storage node is used as the benchmark storage node. In some embodiments, ③ a network state of each storage node among the M reference storage nodes and the target storage node is detected, and a storage node whose network state meets a preset condition is used as the benchmark storage node, where the network state of the storage node may be used for reflecting the rate at which the storage node transmits data. When the network state of the storage node is relatively good, the data transmission rate of the storage node is relatively fast, and when the network state of the storage node is relatively poor, the data transmission rate of the storage node is relatively low. Some embodiments, when sorting the storage nodes according to the network state, for example, sorting the storage nodes according to the network state from the best to the worst to obtain a sorting order of the storage nodes, it may be determined that the network state of the storage node whose sorting position is a first position in the sorting order is the best. It may be determined that the network state of the storage node at the first position meets a preset condition, and in this case, the storage node whose sorting position is at the first position may be used as the benchmark storage node; and the storage node whose sorting position is the first position is used as the benchmark storage node, which is conducive to the rapid transmission of the multimedia data and improves the transmission efficiency. The several manners for determining the benchmark storage node provided above are all examples, and other applicable manners for determining the benchmark storage node may also be applied to some embodiments.

Figure 9:
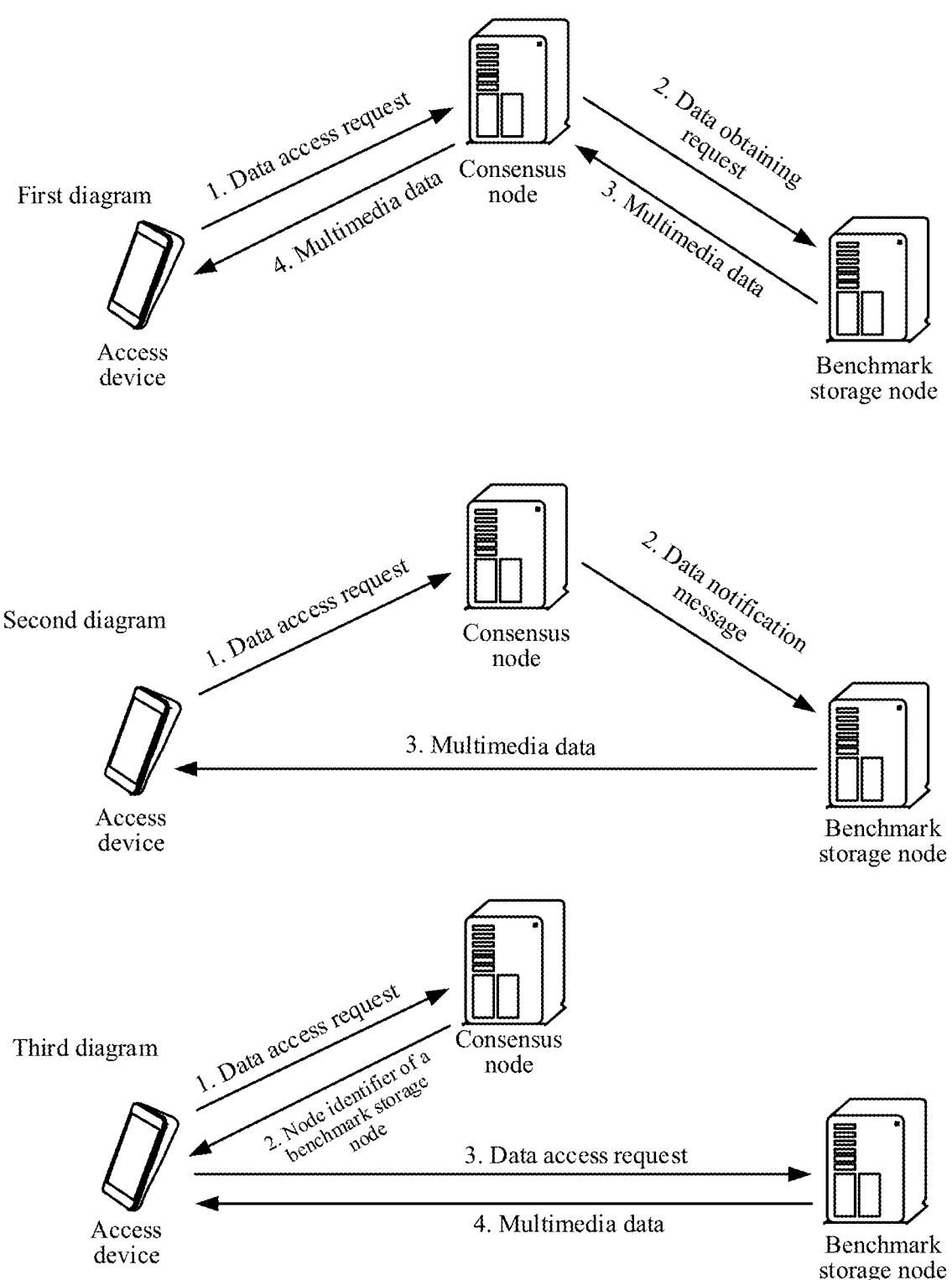
FIG. 9 is a schematic diagram of returning multimedia data through a benchmark storage node according to some embodiments.

After successfully selecting the benchmark storage node, the consensus node may further return the multimedia data to the access device through the benchmark storage node, which may specifically include, but is not limited to, the following implementations of returning the multimedia data to the access device through the benchmark storage node: ① The consensus node transmits a data obtaining request to the benchmark storage node, where the data obtaining request is used for requesting the benchmark storage node to return the multimedia data; and the consensus node receives the multimedia data returned by the benchmark storage node, and transmits the multimedia data to the access device. In the implementation, reference may be made to the first diagram in FIG. 9 for a schematic flowchart of returning the multimedia data through the benchmark storage node. ② The consensus node transmits a data notification message to the benchmark storage node, and the data notification message is used for notifying the benchmark storage node to transmit the multimedia data to the access device. That is, the consensus node may directly notify the benchmark storage node to return the multimedia data to the access device. In this case, the data notification message may carry the device identifier of the access device, so that the benchmark storage node may find the access device according to the device identifier of the access device. In the implementation, reference may be made to the second diagram in FIG. 9 for a schematic flowchart of returning the multimedia data through the benchmark storage node. ③ The consensus node returns a node identifier of the benchmark storage node to the access device, to cause the access device to transmit a data access request to the benchmark storage node based on the node identifier of the benchmark storage node, and receives the multimedia data returned by the benchmark storage node; and in other words, the consensus node may return the node identifier of the benchmark storage node to the access device, so that the access device may request the benchmark storage node to return the multimedia data based on the node identifier of the benchmark storage node. In the implementation, reference may be made to the third diagram in FIG. 9 for a schematic flowchart of returning the multimedia data through the benchmark storage node. The several manners for returning the multimedia data through a benchmark storage node are all examples, and other applicable manners for returning the multimedia data through the benchmark storage node may also be applied to some embodiments.

In some embodiments, a storage node (such as a target storage node) is introduced into the blockchain network, and the storage node is responsible for storing the multimedia data, so that the target storage proof generated based on the multimedia data is transmitted to the consensus node, and the consensus node stores the data identifier of the multimedia data in the blockchain of the consensus node. The data identifier in the blockchain may be used for representing that the multimedia data indicated by the data identifier has been stored in the blockchain network. In the process, a target storage node independent of the consensus node may be used for storing the multimedia data with a relatively large data volume, and only the data identifier with a relatively small data volume may be stored in the blockchain. The manner that separately stores the multimedia data and the data identifier may improve the security of the multimedia data to a certain extent, and may effectively reduce the storage pressure of the blockchain compared with storing the multimedia data in the blockchain, thereby reducing the storage pressure of the consensus node and improving the operation efficiency and stability of the consensus node.

To facilitate better implementation of the method in some embodiments, correspondingly, the apparatus in some embodiments is provided below.

Figure 10:
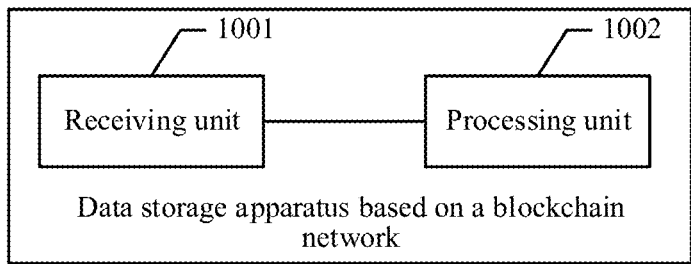
FIG. 10 is a schematic structural diagram of a data storage apparatus based on a blockchain network according to some embodiments.

FIG. 10 is a schematic structural diagram of a data storage apparatus based on a blockchain network according to some embodiments. The data storage apparatus based on the blockchain network may be a computer program (including a program code) running in the target storage node; and the data storage apparatus based on the blockchain network may be used for performing some or all of the operations in the method embodiments shown in FIG. 2 and FIG. 7. The blockchain network includes a consensus node and a target storage node, where the consensus node includes a blockchain, and the data storage apparatus is mounted on the target storage node; and reference may be made to FIG. 10, the data storage apparatus based on the blockchain network includes the following units:

a receiving unit 1001 is configured to receive a storage request transmitted by a target device, the storage request carrying multimedia data;

a processing unit 1002 is configured to store the multimedia data in a local space of the target storage node, and generate a target storage proof of the multimedia data, the target storage proof being used for proving that the target storage node having stored the multimedia data; and the processing unit 1002 is further configured to transmit the target storage proof to the consensus node, to cause the consensus node, after receiving an uploading request about the multimedia data transmitted by the target device, to perform consensus verification on the multimedia data according to the target storage proof, and store a data identifier of the multimedia data in the blockchain of the consensus node after the multimedia data passes the consensus verification; the data identifier in the blockchain being used for indicating that the multimedia data is successfully stored in the blockchain network.

In some embodiments, when the processing unit 1002 is configured to generate the target storage proof of the multimedia data, the processing unit 1002 is specifically configured to:

obtain the data identifier of the multimedia data, and obtain a node identifier of the target storage node; and generate a target storage proof of the multimedia data based on the data identifier and the node identifier of the target storage node.

In some embodiments, when the processing unit 1002 is configured to obtain the data identifier of the multimedia data, the processing unit 1002 is specifically configured to:

perform data analysis on the multimedia data to obtain data attribute information of the multimedia data; and perform a hash operation on the data attribute information to obtain the data identifier of the multimedia data, or directly use the data attribute information of the multimedia data as the data identifier of the multimedia data.

In some embodiments, when the processing unit 1002 is configured to perform data analysis on the multimedia data to obtain data attribute information of the multimedia data, the processing unit 1002 is specifically configured to perform at least one of the following:

performing feature extraction processing on the multimedia data to obtain data features of the multimedia data, and adding the data features to the data attribute information of the multimedia data;

performing keyword extraction processing on the multimedia data to obtain keyword information of the multimedia data, and adding the keyword information to the data attribute information of the multimedia data; and in a case that the multimedia data is text, performing digest extraction processing on the multimedia data to obtain digest information of the multimedia data, and adding the digest information to the data attribute information of the multimedia data.

In some embodiments, the target storage node is a first node type or a second node type. The first node type refers to a node type that requires at least two storage nodes to jointly maintain one piece of data, and the second node type refers to a node type that requires one storage node to independently maintain one piece of data.

In some embodiments, in a case that the node type is the first node type, the blockchain network includes N storage nodes under the first node type, and N is an integer greater than 1; and the target storage node is a storage node in the N storage nodes, and the processing unit 1002 is further configured to:

select M reference storage nodes from remaining storage nodes, where M∈[1, N−1], and the remaining storage nodes are storage nodes other than the target storage node among the N storage nodes; and synchronize the multimedia data to the M reference storage nodes, to cause each reference storage node, after storing the multimedia data, to transmit a reference storage proof about the multimedia data to the consensus node, and to cause the consensus node, after receiving the uploading request, to perform consensus verification on the multimedia data according to the target storage proof and the reference storage proof transmitted by each reference storage node.

In some embodiments, each storage node corresponds to a level, and a manner in which the consensus node performs consensus verification on the multimedia data according to the target storage proof and the reference storage proof transmitted by each reference storage node is as follows: determining that the consensus verification succeeds in response to calculating that a sum of the target storage proof and the reference storage proof in the blockchain network is greater than a quantity threshold; or determining that the consensus verification succeeds in response to calculating that quantities of storage proofs corresponding to storage nodes that have stored the multimedia data at different levels are all greater than quantity thresholds corresponding to the different levels; or performing weighted sum operation on the quantities of storage proofs corresponding to the storage nodes that have stored the multimedia data at the different levels, and determining that the consensus verification succeeds in a case that a storage evaluation score obtained by performing weighted sum operation is greater than a score threshold.

In some embodiments, the processing unit 1002 is further configured to:

receive a data access request transmitted by an access device, where the data access request carries the data identifier of the multimedia data and a device identifier of the access device;

read current ownership information of the multimedia data from the blockchain according to the data identifier, where the current ownership information includes: a device identifier of a current device with ownership of the multimedia data, and the current device refers to: a device that owns the ownership of multimedia data when receiving the data access request; and perform identifier hit processing on the current ownership information by using the device identifier of the access device, and in a case that a hit succeeds, determine that the access device has an access permission to the multimedia data, and return the multimedia data to the access device.

According to some embodiments, the units in the data storage apparatus based on the blockchain network shown in FIG. 10 may be separately or wholly combined into one or several other units, or one (or more) of the units herein may further be divided into a plurality of units of smaller functions. In this way, same operations can be implemented, and implementation of the technical effects of the some embodiments is not affected. The foregoing units are divided based on logical functions. In a practical application, a function of one unit may also be implemented by a plurality of units, or functions of a plurality of units are implemented by one unit. In some embodiments, the data storage apparatus based on the blockchain network may also include other units. In some embodiments, the functions may also be cooperatively implemented by other units and may be cooperatively implemented by a plurality of units. According to some embodiments, a computer program (including program code) that can perform the operations in the corresponding methods shown in FIG. 2 to FIG. 7 may be run on a general computing device, such as a computer, which include processing elements and storage elements such as a central processing unit (CPU), a random access memory (RAM), and a read-only memory (ROM), to construct the data storage apparatus based on the blockchain network shown in FIG. 10, and implement the data storage method based on the blockchain network in some embodiments. The computer program may be recorded in, for example, a computer readable recording medium, and may be loaded into the foregoing computing device by using the computer readable recording medium, and run on the computing device.

In some embodiments, after a receiving unit 1001 receives a storage request transmitted by the target device, the processing unit 1002 may store the multimedia data carried in the storage request to the local space of the target storage node. The processing unit 1002 transmits the target storage proof generated based on the multimedia data to the consensus node, to cause the consensus node to store the data identifier of the multimedia data on the blockchain of the consensus node of the blockchain network. The data identifier in the blockchain may be used for representing that the multimedia data indicated by the data identifier has been stored in the blockchain network. In the process, a target storage node independent of the consensus node may be used for storing the multimedia data with a relatively large data volume, and only the data identifier with a relatively small data volume may be stored in the blockchain. The manner that separately stores the multimedia data and the data identifier may improve the security of the multimedia data to a certain extent, and may effectively reduce the storage pressure of the blockchain compared with storing the multimedia data in the blockchain, thereby reducing the storage pressure of the consensus node and improving the operation efficiency and stability of the consensus node.

Figure 11:
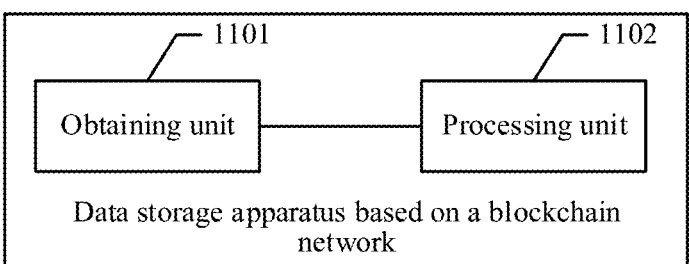
FIG. 11 is a schematic structural diagram of another data storage apparatus based on a blockchain network according to some embodiments.

FIG. 11 is a schematic structural diagram of a data storage apparatus based on a blockchain network according to some embodiments. The data storage apparatus based on the blockchain network may be a computer program (including a program code) running in the target storage node; and the data storage apparatus based on the blockchain network may be used for performing some or all of the operations in the method embodiments shown in FIG. 6 and FIG. 7. The blockchain network includes a consensus node and a target storage node, where the consensus node includes a blockchain, and the data storage apparatus is mounted on the consensus node; and reference may be made to FIG. 11, the data storage apparatus based on the blockchain network includes the following units:

an obtaining unit 1101 is configured to receive an uploading request about multimedia data transmitted by a target device;

the obtaining unit 1101 is further configured to obtain a target storage proof about the multimedia data, the target storage proof being generated and transmitted to the consensus node after the target storage node receives a storage request transmitted by the target device, and the target storage proof being used for proving that the target storage node has stored the multimedia data; and a processing unit 1102 is configured to perform consensus verification on the multimedia data according to the target storage proof, and store a data identifier of the multimedia data in the blockchain of the consensus node after the multimedia data passes the consensus verification; the data identifier in the blockchain being used for indicating that the multimedia data is successfully stored in the blockchain network.

In some embodiments, the target storage node is a first node type or a second node type. The first node type refers to a node type that requires at least two storage nodes to jointly maintain one piece of data, and the second node type refers to a node type that requires one storage node to independently maintain one piece of data.

In some embodiments, in a case that the node type is the first node type, the blockchain network includes N storage nodes under the first node type, and N is an integer greater than 1; and the target storage node is a storage node in the N storage nodes, and the obtaining unit 1101 is further configured to:

obtain a reference storage proof about the multimedia data, where after the target storage node synchronizes the multimedia data to M reference storage nodes, the reference storage proof is generated and transmitted to the consensus node after the M reference storage nodes stores the multimedia data, the M reference storage nodes are selected from remaining storage nodes, the remaining storage nodes are storage nodes other than the target storage node among the N storage nodes, and $M \in [1, N-1]$; and the processing unit 1102 is specifically configured to:

perform consensus verification on the multimedia data according to the target storage proof and the reference storage proof.

In some embodiments, each storage node corresponds to a level, and the processing unit 1102 is specifically configured to:

determine that the consensus verification succeeds in response to calculating that a sum of the target storage proof and the reference storage proof in the blockchain network is greater than a quantity threshold; or determine that the consensus verification succeeds in response to calculating that quantities of storage proofs corresponding to storage nodes that have stored the multimedia data at different levels are all greater than quantity thresholds corresponding to the different levels; or perform weighted sum operation on the quantity of storage proofs corresponding to the storage nodes that have stored the multimedia data at the different levels, and determine that the consensus verification succeeds in a case that a storage evaluation score obtained by performing weighted sum operation is greater than a score threshold.

In some embodiments, the target storage proof is stored in the blockchain; and when the processing unit 1102 is configured to perform consensus verification on the multimedia data according to the target storage proof, the processing unit 1102 is specifically configured to:

obtain a node type of the target storage node;

calculate quantities of storage proofs about the multimedia data that have been stored in the blockchain in a case that the node type is the first node type; determine that the multimedia data passes the consensus verification in a case that the calculated quantity is greater than a quantity threshold; and determine that the multimedia data passes the consensus verification in a case that the node type is the second node type.

In some embodiments, in a case that the blockchain network includes N storage nodes under a first node type, N is an integer greater than 1, and the target storage node is a storage node in the N storage nodes, the multimedia data is synchronously stored in M reference storage nodes among the N storage nodes, and $M \in [1, N-1]$; and the processing unit 1102 is further configured to:

receive a data access request transmitted by an access device, where the data access request carries the data identifier of the multimedia data and a device identifier of the access device;

read current ownership information of the multimedia data from the blockchain according to the data identifier, where the current ownership information includes: a device identifier of a current device with ownership of the multimedia data, and the current device refers to: a device that owns the ownership of the multimedia data when receiving the data access request; and perform identifier hit processing on the current ownership information by using the device identifier of the access device, and select a benchmark storage node from the M reference storage nodes and the target storage node in a case that a hit succeeds; and transmit the multimedia data to the access device through the benchmark storage node.

In some embodiments, when the processing unit 1102 is configured to select a benchmark storage node from the M reference storage nodes and the target storage nodes, the processing unit 1102 is specifically configured to:

randomly select a storage node from the M reference storage nodes and the target storage node as the benchmark storage node;

or calculate a distance between each storage node among the M reference storage nodes and the target storage node and the consensus node, and use a storage node with a shortest distance from the consensus node as the benchmark storage node;

or detect a network state of each storage node among the M reference storage nodes and the target storage node, and use a storage node whose network state meets a preset condition as the benchmark storage node.

In some embodiments, when the processing unit 1102 is configured to transmit the multimedia data to the access device through the benchmark storage node, the processing unit 1102 is specifically configured to:

transmit a data obtaining request to the benchmark storage node, where the data obtaining request is used for requesting the benchmark storage node to return the multimedia data; receive the multimedia data returned by the benchmark storage node, and transmit the multimedia data to the access device;

or transmit a data notification message to the benchmark storage node, where the data notification message is used for notifying the benchmark storage node to transmit the multimedia data to the access device;

or return a node identifier of the benchmark storage node to the access device, to cause the access device to transmit a data access request to the benchmark storage node based on the node identifier of the benchmark storage node, and receive the multimedia data returned by the benchmark storage node.

In some embodiments, the processing unit 1102 is further configured to:

in response to determining that the target device has ownership of the multimedia data, generate initial ownership information of the multimedia data according to a device identifier of the target device, and store the initial ownership information in the blockchain; and in a case that ownership update information transmitted by the target device is received, update the initial ownership information in the blockchain according to the ownership update information.

In some embodiments, the processing unit 1102 is specifically configured to:

perform consensus verification on the multimedia data according to the target storage proof according to a consensus verification policy.

In some embodiments, the consensus verification policy is stored in the blockchain in the form of a smart contract; or the consensus verification policy is embedded in an operating system of the consensus node.

According to some embodiments, the units in the data storage apparatus based on the blockchain network shown in FIG. 10 may be separately or wholly combined into one or several other units, or one (or more) of the units herein may further be divided into a plurality of units of smaller functions. In this way, same operations can be implemented, and implementation of the technical effects of the embodiments is not affected. The foregoing units are divided based on logical functions. In a practical application, a function of one unit may also be implemented by a plurality of units, or functions of a plurality of units are implemented by one unit. In some embodiments, the data storage apparatus based on the blockchain network may also include other units. In some embodiments, the functions may also be cooperatively implemented by other units and may be cooperatively implemented by a plurality of units. According to some embodiments, a computer program (including program code) that can perform the operations in the corresponding methods shown in FIG. 6 to FIG. 7 may be run on a general computing device, such as a computer, which include processing elements and storage elements such as a central processing unit (CPU), a random access memory (RAM), and a read-only memory (ROM), to construct the data storage apparatus based on the blockchain network shown in FIG. 10, and implement the data storage method based on the blockchain network in some embodiments. The computer program may be recorded in, for example, a computer readable recording medium, and may be loaded into the foregoing computing device by using the computer readable recording medium, and run on the computing device.

In some embodiments, after the obtaining unit 1101 receives the target storage proof about the multimedia data, the processing unit 1102 performs consensus on the multimedia data, and stores the data identifier of the multimedia data in the blockchain of the consensus node after the consensus succeeds. The data identifier in the blockchain is used for indicating that the multimedia data is successfully stored in the blockchain network. In the process, a target storage node independent of the consensus node may be used for storing the multimedia data with a relatively large data volume, and only the data identifier with a relatively small data volume may be stored in the blockchain. The manner that separately stores the multimedia data and the data identifier may improve the security of the multimedia data to a certain extent, and may effectively reduce the storage pressure of the blockchain compared with storing the multimedia data in the blockchain, thereby reducing the storage pressure of the consensus node and improving the operation efficiency and stability of the consensus node.

Figure 12:
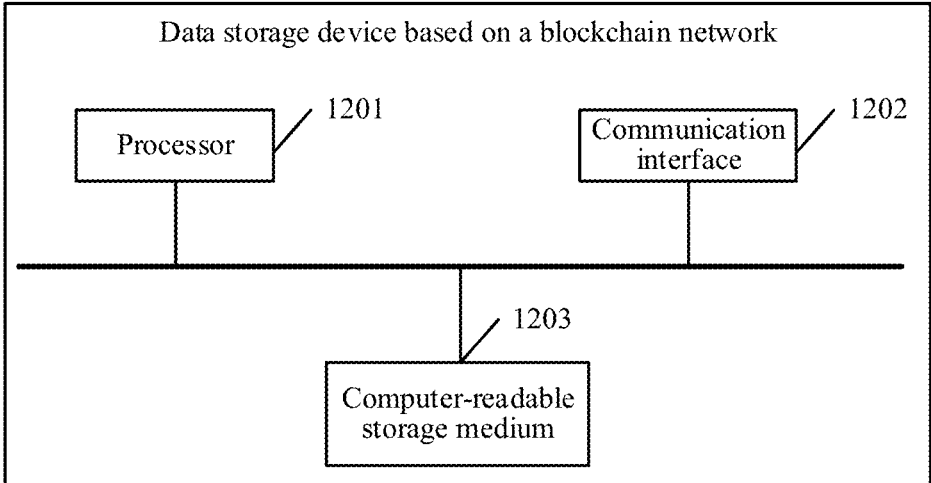
FIG. 12 is a schematic structural diagram of a data storage device based on a blockchain network according to some embodiments.

FIG. 12 is a schematic structural diagram of a data storage device based on a blockchain network according to some embodiments. Referring to FIG. 12, the terminal includes a processor 1201, a communication interface 1202, and a computer-readable storage medium 1203. The processor 1201, the communication interface 1202, and the computer-readable storage medium 1203 may be connected by a bus or other manners. The communication interface 1202 is configured to receive or transmit data. The computer-readable storage medium 1203 may be stored in a memory of the terminal. The computer-readable storage medium 1203 is configured to store a computer program. The computer-readable program includes program instructions. The processor 1201 is configured to execute the program instructions stored in the computer-readable storage medium 1203. The processor 1201 (or referred to as a central processing unit (CPU)) is a computing core and a control core of the terminal, is suitable for implementing one or more instructions, and is specifically suitable for loading and executing the one or more instructions to implement the data storage method flow or corresponding function based on the blockchain network.

Some embodiments further provides a non-transitory computer-readable storage medium. The computer-readable storage medium is a storage device in a terminal and is configured to store programs and data. It may be understood that the computer-readable storage medium herein may include an internal storage medium of the terminal and in some embodiments may also include an extended storage medium supported by the terminal. The computer-readable storage medium provides storage space, and the storage space stores an operating system of the terminal. In addition, the storage space further stores one or more instructions suitable for being loaded and executed by the processor 1201. The instructions may be one or more computer programs (including program code). The computer-readable storage medium herein may be a high-speed RAM or a non-volatile memory, for example, at least one magnetic disk memory. Some embodiments, the computer storage medium may further be at least one computer-readable storage medium located away from the foregoing processor.

In some embodiments, the computer-readable storage medium stores one or more instructions; and one or more instructions stored in the computer-readable storage medium are loaded and executed by the processor 1201, so as to implement the corresponding operations in the foregoing data storage method embodiment based on the blockchain network.

Some embodiments further provide a computer program product or a computer program. The computer program product or the computer program includes a computer instruction. The computer instruction is stored in a computer-readable storage medium. A processor of a data storage device reads the computer instructions from the computer-readable storage medium, and executes the computer instructions, to cause the data storage device to perform the data storage method based on the blockchain network.

A person of ordinary skill in the art may notice that the units and algorithm operations described with reference to some embodiments can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the disclosure.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a special-purpose computer, a computer network, or another programmable device. The computer instruction may be stored in a computer-readable storage medium, or transmitted by using the computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (solid state disk, SSD)), or the like.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A data storage method, performed by at least one processor, comprising:

receiving a storage request transmitted by a target device, the storage request carrying multimedia data;

storing the multimedia data in a local space of a target storage node in a blockchain network, and generating a target storage proof of the multimedia data, the target storage proof indicating that the target storage node has stored the multimedia data;

transmitting the target storage proof to a consensus node in the blockchain network independent of the target storage node, to cause the consensus node, after receiving an uploading request about the multimedia data transmitted by the target device, to perform consensus verification on the multimedia data according to the target storage proof and store a data identifier of the multimedia data that passes the consensus verification in a blockchain of the consensus node, the data identifier indicating that the multimedia data has been successfully stored in the blockchain network; and returning a notification message to the target device after transmitting the target storage proof to the consensus device, the notification message notifying a user of the target device that the multimedia data has been successfully stored in the blockchain network and the data identifier of the multimedia data has been successfully transmitted to the consensus node, wherein generating the target storage proof comprises:

obtaining the data identifier of the multimedia data, and obtaining a node identifier of the target storage node; and generating the target storage proof of the multimedia data based on the data identifier and the node identifier of the target storage node, and wherein obtaining the data identifier of the multimedia data comprises:

performing data analysis on the multimedia data to obtain data attribute information of the multimedia data; and performing a hash operation on the data attribute information to obtain the data identifier of the multimedia data.

2. The data storage method according to claim 1, wherein the performing data analysis on the multimedia data comprises at least one of the following:

performing feature extraction processing on the multimedia data to obtain data features of the multimedia data, and adding the data features to the data attribute information of the multimedia data;

performing keyword extraction processing on the multimedia data to obtain keyword information of the multimedia data, and adding the keyword information to the data attribute information of the multimedia data; and based on the multimedia data being text, performing digest extraction processing on the multimedia data to obtain digest information of the multimedia data, and adding the digest information to the data attribute information of the multimedia data.

3. The data storage method according to claim 1, wherein a node type of the target storage node is a first node type or a second node type, the first node type including a node type that requires at least two storage nodes to jointly maintain one piece of data, and the second node type including a node type that requires one storage node to independently maintain the one piece of data.

4. The data storage method according to claim 3, wherein based on the node type being the first node type, the blockchain network comprises N storage nodes under the first node type, and N is an integer greater than 1; and the target storage node is a storage node in the N storage nodes; and the data storage method further comprises:

selecting M reference storage nodes from remaining storage nodes, wherein $M \in [1, N-1]$, and the remaining storage nodes are storage nodes other than the target storage node among the N storage nodes; and synchronizing the multimedia data to the M reference storage nodes, to cause each of the M reference storage nodes, after storing the multimedia data, to transmit a reference storage proof about the multimedia data to the consensus node, and to cause the consensus node, after receiving the uploading request, to perform the consensus verification on the multimedia data according to the target storage proof and the reference storage proof transmitted by each of the M reference storage nodes.

5. The data storage method according to claim 4, wherein each of the N storage nodes corresponds to a level, and a manner in which the consensus node performs the consensus verification on the multimedia data according to the target storage proof and the reference storage proof transmitted by each of the M reference storage nodes is as follows:

determining that the consensus verification succeeds in response to calculating that a sum of the target storage proof and the reference storage proof in the blockchain network is greater than a quantity threshold; or determining that the consensus verification succeeds in response to calculating that quantities of storage proofs corresponding to storage nodes of the N storage nodes that have stored the multimedia data at different levels are all greater than quantity thresholds corresponding to the different levels; or performing weighted sum operation on the quantities of storage proofs corresponding to the storage nodes of the N storage nodes that have stored the multimedia data at the different levels, and determining that the consensus verification succeeds based on a storage evaluation score obtained by performing the weighted sum operation being greater than a score threshold.

6. The data storage method according to claim 1, further comprising:

receiving a data access request transmitted by an access device, the data access request carrying the data identifier of the multimedia data and a device identifier of the access device;

reading current ownership information of the multimedia data from the blockchain according to the data identifier, the current ownership information comprising a device identifier of a current device with ownership of the multimedia data, and the current device being a device that owns the ownership of the multimedia data in response to receiving the data access request; and performing identifier hit processing on the current ownership information by using the device identifier of the access device, and based on a hit succeeding, determining that the access device has an access permission to the multimedia data and returning the multimedia data to the access device.

7. A data storage apparatus comprising:

at least one non-transitory memory configured to store program code; and at least one processor configured to read the program code and operate as instructed by the program code, the program code comprising:

receiving code configured to cause the at least one processor to receive a storage request transmitted by a target device, the storage request carrying multimedia data; and processing code configured to cause the at least one processor to:

store the multimedia data in a local space of a target storage node in a blockchain network, and generate a target storage proof of the multimedia data, the target storage proof indicating that the target storage node has stored the multimedia data;

transmit the target storage proof to a consensus node in the blockchain network independent of the target storage node, to cause the consensus node, after receiving an uploading request about the multimedia data transmitted by the target device, to perform consensus verification on the multimedia data according to the target storage proof and store a data identifier of the multimedia data that passes the consensus verification in a blockchain of the consensus node, the data identifier indicating that the multimedia data has been successfully stored in the blockchain network; and return a notification message to the target device after transmitting the target storage proof to the consensus device, the notification message notifying a user of the target device that the multimedia data has been successfully stored in the blockchain network and the data identifier of the multimedia data has been successfully transmitted to the consensus node, wherein the processing code is further configured to cause the at least one processor:

perform data analysis on the multimedia data to obtain data attribute information of the multimedia data;

perform a hash operation on the data attribute information to obtain the data identifier of the multimedia data; and generate the target storage proof of the multimedia data based on the data identifier and a node identifier of the target storage node.

8. The data storage apparatus according to claim 7, wherein the processing code is further configured to cause the at least one processor to perform at least one of the following:

perform feature extraction processing on the multimedia data to obtain data features of the multimedia data, and adding the data features to the data attribute information of the multimedia data;

perform keyword extraction processing on the multimedia data to obtain keyword information of the multimedia data, and add the keyword information to the data attribute information of the multimedia data; and based the multimedia data being text, perform digest extraction processing on the multimedia data to obtain digest information of the multimedia data, and add the digest information to the data attribute information of the multimedia data.

9. The data storage apparatus according to claim 7, wherein a node type of the target storage node is a first node type or a second node type, the first node type including a node type that requires at least two storage nodes to jointly maintain one piece of data and the second node type including a node type that requires one storage node to independently maintain the one piece of data.

10. The data storage apparatus according to claim 9, wherein based on the node type being the first node type, the blockchain network comprises N storage nodes under the first node type, and N is an integer greater than 1; and the target storage node is a storage node in the N storage nodes; and the processing code is further configured to cause the at least one processor to:

select M reference storage nodes from remaining storage nodes, wherein M∈[1, N−1], and the remaining storage nodes are storage nodes other than the target storage node among the N storage nodes; and synchronize the multimedia data to the M reference storage nodes, to cause each of the M reference storage nodes, after storing the multimedia data, to transmit a reference storage proof about the multimedia data to the consensus node, and to cause the consensus node, after receiving the uploading request, to perform the consensus verification on the multimedia data according to the target storage proof and the reference storage proof transmitted by each of the M reference storage nodes.

11. The data storage apparatus according to claim 10, wherein each of the N storage nodes corresponds to a level, and a manner in which the consensus node performs the consensus verification on the multimedia data according to the target storage proof and the reference storage proof transmitted by each of the M reference storage nodes is as follows:

determining that the consensus verification succeeds in response to calculating that a sum of the target storage proof and the reference storage proof in the blockchain network is greater than a quantity threshold; or determining that the consensus verification succeeds in response to calculating that quantities of storage proofs corresponding to storage nodes of the N storage nodes that have stored the multimedia data at different levels are all greater than quantity thresholds corresponding to the different levels; or performing weighted sum operation on the quantities of storage proofs corresponding to the storage nodes of the N storage nodes that have stored the multimedia data at the different levels, and determining that the consensus verification succeeds based on a storage evaluation score obtained by performing the weighted sum operation being greater than a score threshold.

12. The data storage apparatus according to claim 7, wherein the processing code is further configured to cause the at least one processor to:

receive a data access request transmitted by an access device, the data access request carries the data identifier of the multimedia data and a device identifier of the access device;

read current ownership information of the multimedia data from the blockchain according to the data identifier, the current ownership information includes a device identifier of a current device with ownership of the multimedia data, and the current device being to a device that owns the ownership of the multimedia data in response to receiving the data access request; and perform identifier hit processing on the current ownership information by using the device identifier of the access device, and based on a hit succeeding, determine that the access device has an access permission to the multimedia data, and return the multimedia data to the access device.

13. A non-transitory computer-readable storage medium, storing computer code that, when executed at least one processor, causes the at least one processor to:

receive a storage request transmitted by a target device, the storage request carrying multimedia data;

store the multimedia data in a local space of a target storage node in a blockchain network, and generate a target storage proof of the multimedia data, the target storage proof indicating that the target storage node has stored the multimedia data;

transmit the target storage proof to a consensus node in the blockchain network independent of the target storage node, to cause the consensus node, after receiving an uploading request about the multimedia data transmitted by the target device, to perform consensus verification on the multimedia data according to the target storage proof, and store a data identifier of the multimedia data that passes the consensus verification in a blockchain of the consensus node, the data identifier indicating that the multimedia data has been successfully stored in the blockchain network; and return a notification message to the target device after transmitting the target storage proof to the consensus device, the notification message notifying a user of the target device that the multimedia data has been successfully stored in the blockchain network and the data identifier of the multimedia data has been successfully transmitted to the consensus node, wherein generating the target storage proof comprises:

obtaining the data identifier of the multimedia data, and obtaining a node identifier of the target storage node; and generating the target storage proof of the multimedia data based on the data identifier and the node identifier of the target storage node, and wherein obtaining the data identifier of the multimedia data comprises:

performing data analysis on the multimedia data to obtain data attribute information of the multimedia data; and performing a hash operation on the data attribute information to obtain the data identifier of the multimedia data.

14. The non-transitory computer-readable storage medium according to claim 13, wherein the performing data analysis on the multimedia data comprises at least one of the following:

performing feature extraction processing on the multimedia data to obtain data features of the multimedia data, and adding the data features to the data attribute information of the multimedia data;

performing keyword extraction processing on the multimedia data to obtain keyword information of the multimedia data, and adding the keyword information to the data attribute information of the multimedia data; and based the multimedia data being text, performing digest extraction processing on the multimedia data to obtain digest information of the multimedia data, and adding the digest information to the data attribute information of the multimedia data.

* * * * *